US012196020B2

(12) United States Patent
Mayer, III et al.

(10) Patent No.: US 12,196,020 B2
(45) Date of Patent: Jan. 14, 2025

(54) RESTROOM DOOR ASSEMBLY

(71) Applicant: Sloan Valve Company, Franklin Park, IL (US)

(72) Inventors: Gerard Mayer, III, Franklin Park, IL (US); Clifford Krapfl, Franklin Park, IL (US); John Beckman, Franklin Park, IL (US); Jason Bosnak, Franklin Park, IL (US); Jose Gonzalez, Franklin Park, IL (US); Aaron Siewert, Franklin Park, IL (US); Warren Friedl, Chicago, IL (US); Greg Chaganos, Franklin Park, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 17/963,266

(22) Filed: Oct. 11, 2022

(65) Prior Publication Data

US 2023/0115129 A1 Apr. 13, 2023

Related U.S. Application Data

(60) Provisional application No. 63/253,895, filed on Oct. 8, 2021.

(51) Int. Cl.

| | |
|---|---|
| ***E05D 15/06*** | (2006.01) |
| ***E05F 15/632*** | (2015.01) |
| ***E06B 3/46*** | (2006.01) |

(52) U.S. Cl.

CPC ....... *E05D 15/063* (2013.01); *E05D 15/0656* (2013.01); *E05F 15/632* (2015.01);

(Continued)

(58) Field of Classification Search

CPC . E05D 15/063; E05D 15/0656; E05D 15/632; E05D 15/0678; E05D 15/0691;

(Continued)

(56) References Cited

U.S. PATENT DOCUMENTS 3,950,952 A * 4/1976 Krings .................... E02D 17/08 104/118
4,545,630 A * 10/1985 Izumi ....................... G12B 9/04 312/285

(Continued)

FOREIGN PATENT DOCUMENTS

WO WO-2021122602 A1 * 6/2021

OTHER PUBLICATIONS

"Washroom Partitions"; AJW Architectural Products ; retrieved Oct. 1, 2021; disclosure date unknown but prior to the filing date of the present application; URL:<https://ajw.com/downloads/partitions/others/AJW_WPartitions_2014_Web.pdf>.

(Continued)

*Primary Examiner* — Jerry E Redman
(74) *Attorney, Agent, or Firm* — Banner & Witcoff, Ltd.

(57) ABSTRACT

A door assembly for a restroom stall having first and second opposed side walls and a front opening includes first and second housings defining first and second inner cavities and configured to be mounted on the first and second side walls, first and second doors moveably mounted on the first and second housings, each having opposed inner and outer surfaces that are curved and being moveable along an arcing path between an open position and a closed position. In the open position, the door is retracted within the respective housing and at least partially received in the respective inner cavity, and in the closed position, the door is extended outward of the respective housing relative to the open position. In the closed positions, the first and second doors (Continued)

combine to obstruct the front opening, and in the open positions, the first and second doors permit passage through the front opening.

24 Claims, 36 Drawing Sheets

(52) U.S. Cl.
CPC ......... *E06B 3/4645* (2013.01); *E05Y 2201/10* (2013.01); *E05Y 2201/434* (2013.01); *E05Y 2201/684* (2013.01); *E05Y 2201/688* (2013.01); *E05Y 2400/415* (2013.01); *E05Y 2600/452* (2013.01); *E05Y 2800/266* (2013.01); *E05Y 2900/112* (2013.01); *E05Y 2900/132* (2013.01)

(58) Field of Classification Search
CPC . E06B 3/4645; E06B 3/7007; E05Y 2201/10; E05Y 2201/434; E05Y 2900/112; E04B 7/7405
USPC .................................. 49/41, 409; 4/612, 614
See application file for complete search history.

(56) References Cited

U.S. PATENT DOCUMENTS 4,651,469 A * 3/1987 Ngian ................. E05D 15/1021 49/411
4,785,579 A * 11/1988 Sugiyama ........... E05D 15/0604 49/141
4,991,347 A * 2/1991 Takimoto .............. E05F 15/643 474/200
5,301,468 A * 4/1994 Kamezaki ............. E05F 15/638 49/225
5,494,137 A * 2/1996 Kowalczyk ........... E05D 15/063 187/334
5,542,211 A * 8/1996 Colombo ................ E06B 3/906 109/8
5,566,505 A * 10/1996 Kamezaki ........... E05D 15/1021 49/225
5,742,956 A 4/1998 Tarver
5,855,027 A 1/1999 Macedo
5,924,566 A 7/1999 Gibbs
5,984,100 A 11/1999 Ramsey et al.
5,987,817 A * 11/1999 Hein ..................... E05D 15/063 49/40
5,992,095 A * 11/1999 Tilley ...................... E05G 7/004 49/125
6,023,794 A 2/2000 Nein
6,032,762 A * 3/2000 O'Donnell ............ E05F 17/004 187/316
6,098,342 A * 8/2000 Bischof ............... E05D 15/0613 49/506
6,128,875 A 10/2000 Quaintance
6,252,730 B1 6/2001 Chabot
6,270,275 B1 8/2001 Martz
6,363,760 B1 4/2002 Sigmond
6,371,584 B1 4/2002 Alreck
6,375,562 B1 * 4/2002 Hein ....................... E06B 3/903 49/31
6,381,769 B1 5/2002 Lofquist, Jr.
6,408,457 B1 6/2002 Bader
6,412,220 B1 * 7/2002 Lindley ................... E06B 11/00 49/40
6,459,377 B2 10/2002 Sakai et al.
6,520,351 B1 2/2003 Zadro
6,691,475 B1 2/2004 Tiongco et al.
6,708,448 B2 * 3/2004 Zappa ................... E05F 15/635 49/362
6,982,399 B1 1/2006 Hunts
6,990,772 B2 1/2006 Eckel et al.
7,068,169 B2 6/2006 Collins et al.
7,152,257 B2 12/2006 Lasch et al.
7,178,691 B1 2/2007 Rux
7,246,413 B2 7/2007 Portelli
7,249,737 B2 * 7/2007 Simmons ........... B64D 45/0028 244/129.4
7,316,086 B2 1/2008 Schuling et al.
7,407,237 B2 8/2008 Bright
7,466,237 B1 12/2008 Cook
7,469,949 B2 12/2008 Harder
7,472,964 B2 1/2009 King
7,526,279 B1 4/2009 Fujisaki
7,806,463 B2 10/2010 Oliver et al.
7,907,942 B1 3/2011 Fujisaki
RE42,991 E 12/2011 Cook
8,141,296 B2 3/2012 Bem
8,169,317 B2 5/2012 Lemerand et al.
8,182,053 B1 5/2012 Schacher et al.
8,284,018 B2 10/2012 Ibsies
8,336,500 B1 12/2012 Britt
RE44,039 E 3/2013 Cook
8,393,127 B1 3/2013 Jensen
8,651,571 B1 2/2014 Richardson
8,904,570 B2 12/2014 Brooks
8,915,384 B2 12/2014 Immerman et al.
8,925,863 B2 * 1/2015 Pujol .................. B64D 45/0036 244/118.5
9,097,030 B1 8/2015 Manterfield
9,098,993 B2 8/2015 Reed, Jr.
9,217,272 B2 12/2015 Phillips
9,353,508 B2 5/2016 Abello Jimenez
9,587,391 B1 3/2017 Anderson
9,617,788 B2 4/2017 Goodson
9,730,556 B2 8/2017 Wei
9,771,751 B2 9/2017 Ibsies
9,826,867 B2 11/2017 Krause et al.
10,257,470 B2 4/2019 Ibsies
10,550,630 B2 2/2020 Xie
10,624,453 B2 4/2020 Jeon et al.
D887,021 S 6/2020 Casal
10,667,605 B2 6/2020 Jeon et al.
10,813,485 B2 10/2020 Peabody
10,847,008 B2 11/2020 Geng et al.
10,941,552 B2 3/2021 Grody
10,974,834 B2 4/2021 Gharia et al.
11,111,660 B2 9/2021 Wu
11,427,442 B2 * 8/2022 Kashiwakura ...... B66B 11/0206
2002/0175245 A1 * 11/2002 Sheremeta ......... B64D 45/0028 244/118.5
2010/0263279 A1 * 10/2010 Pessers ..................... E06B 3/90 49/31
2016/0287027 A1 * 10/2016 Hayes ................. E05D 15/0643
2023/0115129 A1 * 4/2023 Mayer, III ............ E06B 3/4654 49/41

OTHER PUBLICATIONS

"Washroom Partitions"; ASI Accurate Partitions; retrieved Oct. 1, 2021; disclosure date unknown but prior to the filing date of the present application; URL: <https://asi-accuratepartitions.com/innovations/>.
"Toilet Partitions"; Bradley Corp; retrieved Oct. 5, 2021; disclosure date unknown but prior to the filing date of the present application; URL: <https://www.bradleycorp.com/product-category/toilet-partitions>.
"Products"; Scranton Products; retrieved Oct. 5, 2021; disclosure date unknown but prior to the filing date of the present application; URL: <https://www.scrantonproducts.com/products/>.
"Columbia Partitions"; PSISC; retrieved Oct. 5, 2021; disclosure date unknown but prior to the filing date of the present application; URL: <https://www.psisc.com/toilet-partitions>.
"Hadrian Toilet Partitions"; Partition Plus; retrieved Oct. 5, 2021; disclosure date unknown but prior to the filing date of the present application; URL: <https://www.partitionplus.com/toilet-partitions/hadrian-toilet-partitions/?gclid=EAIaIQobChMIv4bktfP-8glVw3xvBB24yAJKEAAYASAAEglvi_D_BwE>.
"Metpar"; Metpar; retrieved Oct. 5, 2021; disclosure date unknown

(56) References Cited

OTHER PUBLICATIONS but prior to the filing date of the present application; URL: <https://metpar.com/>.
"PRIVADA Cubicles"; Bobrick; retrieved Jan. 11, 2023; published Sep. 20, 2020; URL: <https://www.bobrick.com/products/toilet-partitions-cubicle-systems/privada-cubicles/>.
"Evolve Cubicles"; Bobrick; retrieved Jan. 11, 2023; published Sep. 20, 2020; URL: <https://www.bobrick.com/products/toilet-partitions-cubicle-systems/evolve-cubicles/>.
"Traditional Partitions"; Bobrick; retrieved Jan. 11, 2023; published Sep. 20, 2020; URL: <https://www.bobrick.com/products/toilet-partitions-cubicle-systems/traditional-partitions/>.

* cited by examiner

RESTROOM DOOR ASSEMBLY

CROSS-REFERENCE TO RELATED APPLICATION

This application is a nonprovisional of, and claims priority to, U.S. Provisional Application No. 63/253,895, filed Oct. 8, 2021, which prior application is incorporated by reference herein.

FIELD OF THE INVENTION

This disclosure relates to a door assembly for use in a restroom, such as a commercial restroom water closet, and more specifically to a door assembly with a door that provides less intrusion into the usable space within the water closet.

BACKGROUND

Restroom stalls often have a relatively small amount of usable space, i.e., space between the toilet, the door, the stall walls, and any fixtures on the walls, in which a user can stand. Doors on restroom stalls typically swing inwardly through a large portion of such usable space, which in some circumstances may cause difficulty in avoiding the swinging door for a user attempting to exit the stall. This difficulty is further complicated when additional objects are located in the stall, such as luggage. Additionally, operating the door on a restroom stall requires users to touch surfaces numerous times before washing their hands, which creates sanitary concerns.

The present disclosure is provided to address this need and other needs in existing restroom stall doors and door assemblies. A full discussion of the features and advantages of the present invention is deferred to the following detailed description, which proceeds with reference to the accompanying drawings.

BRIEF SUMMARY

Aspects of the disclosure relate to a door assembly configured for use in a restroom stall having first and second opposed side walls and a front opening. The door assembly includes a first housing defining a first inner cavity and configured to be mounted on the first side wall, a second housing defining a second inner cavity and configured to be mounted on the second side wall, a first door moveably mounted on the first housing, and a second door moveably mounted on the second housing. The first door has opposed inner and outer surfaces that are curved, and the first door is moveable along a first arcing path between an open position, where the first door is retracted within the first housing and at least partially received in the first inner cavity, and a closed position, where the first door is extended outward of the first housing relative to the open position. The second door having opposed inner and outer surfaces that are curved, and the second door is moveable along a second arcing path between an open position, where the second door is retracted within the second housing and at least partially received in the second inner cavity, and a closed position, where the second door is extended outward of the second housing relative to the open position. The first and second doors are configured such that, in the closed positions, the first and second doors combine to obstruct the front opening, and in the open positions, the first and second doors permit passage through the front opening.

According to one aspect, a first track is positioned on a top side of the first door and is curved along the top side of the first door, and a second track is positioned on a top side of the second door and is curved along the top side of the second door. A first carriage is positioned on the first housing and engages the first track to permit the first door to move between the open position and the closed position, such that the first track defines the first arcing path, and a second carriage is positioned on the second housing and engages the second track to permit the second door to move between the open position and the closed position, such that the second track defines the second arcing path. In one configuration, the assembly further includes a plurality of first rollers rotatably mounted on the first carriage and configured to engage the first track and to roll along the first track as the first door moves between the open position and the closed position, and a plurality of second rollers rotatably mounted on the second carriage and configured to engage the second track and to roll along the second track as the second door moves between the open position and the closed position.

According to another aspect, a first track is positioned on a top side of the first door and is curved along the top side of the first door, and a second track is positioned on a top side of the second door and is curved along the top side of the second door. A plurality of first rollers is rotatably mounted on the first housing and configured to engage the first track and to roll along the first track as the first door moves between the open position and the closed position, and a plurality of second rollers is rotatably mounted on the second housing and configured to engage the second track and to roll along the second track as the second door moves between the open position and the closed position. At least one of the plurality of first rollers is a first powered roller configured to power movement of the first door between the open and closed positions by exerting force on the first track, and at least one of the plurality of second rollers is a second powered roller configured to power movement of the second door between the open and closed positions by exerting force on the second track. In one configuration, a first motor is mounted on the first housing and connected to the first powered roller to power rotation of the first powered roller to move the first door between the open position and the closed position, and a second motor is mounted on the second housing and connected to the second powered roller to power rotation of the second powered roller to move the second door between the open position and the closed position. At least one controller may be configured to control operation of the first motor and the second motor to move the first and second doors.

According to a further aspect, the first housing further includes a first curved inner panel facing inward from the first housing and defining the first inner cavity, and the second housing further comprises a second curved inner panel facing inward from the second housing and defining the second inner cavity.

According to yet another aspect, the first housing has a first outer side opposite the first inner panel and configured to face the first side wall, and the first outer side of the first housing is open such that the first inner cavity is configured to be further defined by the first side wall. The second housing has a second outer side opposite the second inner panel and configured to face the second side wall, and the second outer side of the second housing is open such that the second inner cavity is configured to be further defined by the second side wall.

According to a still further aspect, the first housing has a first outer side opposite the first inner panel and configured to face the first side wall, and the first outer side of the first housing is open such that the first inner cavity is configured to be further defined by the first side wall. The second housing has a second outer side opposite the second inner panel and configured to face the second side wall, and the second outer side of the second housing is open such that the second inner cavity is configured to be further defined by the second side wall.

According to an additional aspect, the first door has a first outer end distal from the first housing in the closed position, with a first closure member at the first outer end, and the second door has a second outer end distal from the second housing in the closed position, with a second closure member at the second outer end. The first closure member and the second closure member have complementary interlocking structures to obstruct visibility between the first and second closure members.

Additional aspects of the disclosure relate to a door assembly configured for mounting on a first wall, including a first housing configured to be mounted on the first wall, a first door moveably mounted on the first housing, and a first mounting assembly mounting the first door on the first housing. The first door has opposed inner and outer surfaces that are curved, and the first door is moveable along a first arcing path between an open position, where the first door is retracted with respect to the first housing, and a closed position, where the first door is extended outward of the first housing relative to the open position. The first mounting assembly includes a first track positioned on one of the first door and the first housing at a top side of the first door, where the first housing and the top side of the first door are operably engaged at the first track to permit the first door to move between the open position and the closed position, and a second track positioned on one of the first door and the first housing at a bottom side of the first door, where the first housing and the bottom side of the first door are operably engaged at the second track to permit the first door to move between the open position and the closed position. The first mounting assembly includes first, second, and third points of contact with the first door at the first track and the second track. The first point of contact is configured to exert a first vertical force component on the first door, the second point of contact is laterally offset from the first point of contact and configured to exert a second vertical force component on the first door, and the third point of contact is vertically offset from the first point of contact and the second point of contact and configured to exert a third vertical force component on the first door. The first vertical force component, the second vertical force component, and the third vertical force component combine to resist rotation of the door.

According to one aspect, the first mounting assembly further includes a first carriage positioned on the other of the first door and the first housing, where the first carriage engages the first track to permit the first door to move between the open position and the closed position. In one configuration, the first mounting assembly also includes a second carriage positioned on the other of the first door and the first housing, where the second carriage engages the second track to permit the first door to move between the open position and the closed position. In another configuration, the first mounting assembly also includes a plurality of rollers rotatably mounted on the first carriage and configured to engage the first track and to roll along the first track as the first door moves between the open position and the closed position. The plurality of rollers may form at least the first and second points of contact.

According to another aspect, the first point of contact and the second point of contact are located at the first track at the top side of the first door, and the third point of contact is located at the second track at the bottom side of the first door. In one configuration, the third point of contact is directly below and vertically offset from the first point of contact, and the second point of contact is laterally offset from the first and third points of contact and also vertically offset from the third point of contact.

Further aspects of the disclosure relate to a door assembly configured for mounting on a first wall, including a first housing configured to be mounted on the first wall, a first door moveably mounted on the first housing, and a first track positioned on the top side of the first door. The first door has opposed inner and outer surfaces that are curved and a top side and a bottom side that are curved with the inner and outer surfaces, and the first door is moveable along a first arcing path between an open position, where the first door is retracted with respect to the first housing, and a closed position, where the first door is extended outward of the first housing relative to the open position. The first housing and the top side of the first door are operably engaged at the first track to permit the first door to move between the open position and the closed position. The assembly also includes a first top roller engaging a top of the first track, a second top roller engaging the top of the first track and spaced from the first top roller along a curved length of the top side of the door, a first bottom roller engaging a bottom of the first track, and a second bottom roller engaging the bottom of the first track. The first and second top rollers and the first and second bottom rollers are configured to roll along the first track as the first door moves between the open position and the closed position. At least one of the first and second top rollers and the first and second bottom rollers is a powered roller configured to power movement of the first door between the open and closed positions by exerting force on the first track.

According to one aspect, the first track has a slot extending along the curved length of the first door, and the first bottom roller is mounted on a first leg that extends downward through the slot to position the first bottom roller on the bottom of the first track. In one configuration, the first top roller is also mounted on the first leg at a location above the first track. In another configuration, the assembly also includes a third top roller engaging the top of the first track adjacent to the first top roller, such that the first top roller and the third top roller are positioned on opposite sides of the slot. In this configuration, a third bottom roller may also mounted on the first leg to engage the bottom of the first track adjacent to the first bottom roller, such that the first bottom roller and the third bottom roller are positioned on opposite sides of the slot.

According to another aspect, the first bottom roller and the second bottom roller are positioned within the first door, between the inner and outer surfaces thereof.

According to a further aspect, the first top roller is the powered roller, and the first bottom roller is positioned below the first top roller.

According to yet another aspect, the assembly includes a third top roller engaging the top of the first track and spaced from the first top roller and the second top roller along a curved length of the top side of the door. In one configuration, the first top roller is the powered roller, the first bottom roller is positioned directly below the third top roller, and the second bottom roller is positioned directly below the second top roller.

Other aspects of the disclosure relate to a method of operating a door assembly in a restroom stall having first and second opposed side walls and a front opening, the door assembly including a first housing mounted on the first side wall and defining a first inner cavity, a second housing mounted on the second side wall and defining a second inner cavity, a first door mounted on the first housing and having opposed inner and outer surfaces that are curved, and a second door moveably mounted on the second housing and having opposed inner and outer surfaces that are curved. The method includes moving the first door and the second door simultaneously from a closed position, where the first and second doors are extended outward of the first and second housings to obstruct the front opening, to an open position, wherein the first and second doors are retracted within the first and second housings to permit passage of a user through the front opening, or moving the first and second doors from the open position to the closed position. The first door moves along a first arcing path from the closed position to the open position, and the second door moves along a second arcing path from the closed position to the open position.

According to one aspect, the door assembly further includes a plurality of first rollers engaging the first door, such that the plurality of first rollers roll along the first door as the first door moves from the closed position to the open position, and a plurality of second rollers engaging the second door, such that the plurality of second rollers roll along the second door as the second door moves from the closed position to the open position. The plurality of first rollers includes a first powered roller and the plurality of second rollers includes a second powered roller. Moving the first door and the second door simultaneously from the closed position to the open position includes powering movement of the first door from the closed position to the open position by rotating the first powered roller to exerting force on the first door, and powering movement of the second door from the closed position to the open position by rotating the second powered roller to exerting force on the second door.

According to another aspect, the door assembly further includes a first position sensor configured to detect a position of the first door, a second position sensor configured to detect a position of the second door, and a controller that receives input from the first and second position sensors and controls movement of the first and second doors from the closed position to the open position based on the input from the first and second position sensors. In one configuration, the controller is configured for performing a door position calibration operation for the first and second doors upon activation, using the input from the first and second position sensors.

According to a further aspect, the door assembly further includes a sensor panel configured to receive input from a user, and a controller that receives input from the sensor panel and controls movement of the first and second doors from the closed position to the open position based on the input from the sensor panel. In one configuration, the sensor panel further includes a first position sensor configured to receive the input from the user to move the first and second doors from the closed position to the open position by detecting proximity of the user to the first position sensor, and a second position sensor displaced from the first position sensor and configured to detect proximity of the user to the second position sensor. When the controller receives input detecting proximity of the user to the second position sensor, the controller does not cause the first and second doors to move from the closed position to the open position.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1A:
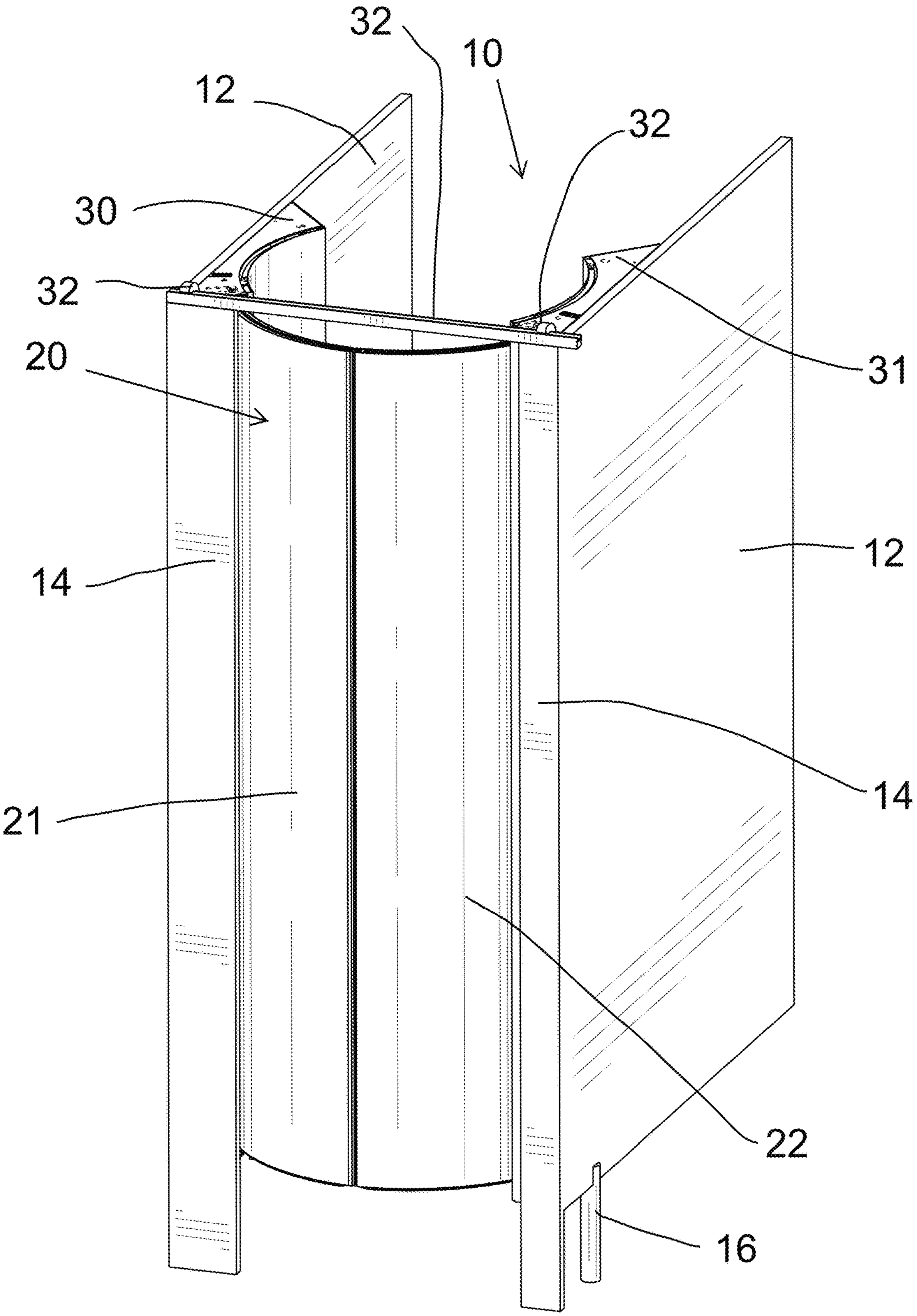
FIG. 1A is a perspective view of a restroom stall with one embodiment of a door assembly according to aspects of the disclosure, with two doors of the door assembly shown in closed positions.
Figure 1B:
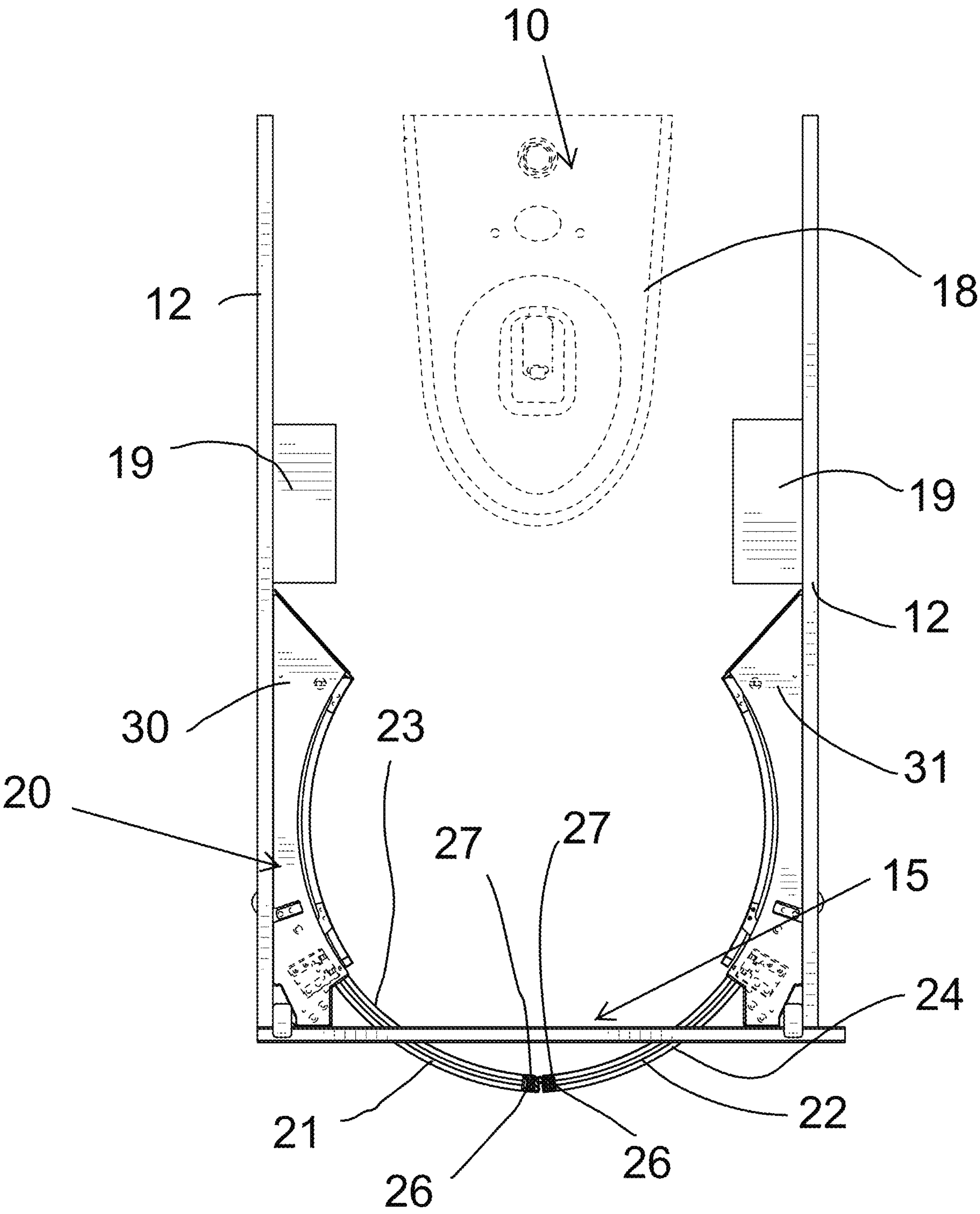
FIG. 1B is a top view of the restroom stall and the door assembly of FIG. 1A.
Figure 1C:
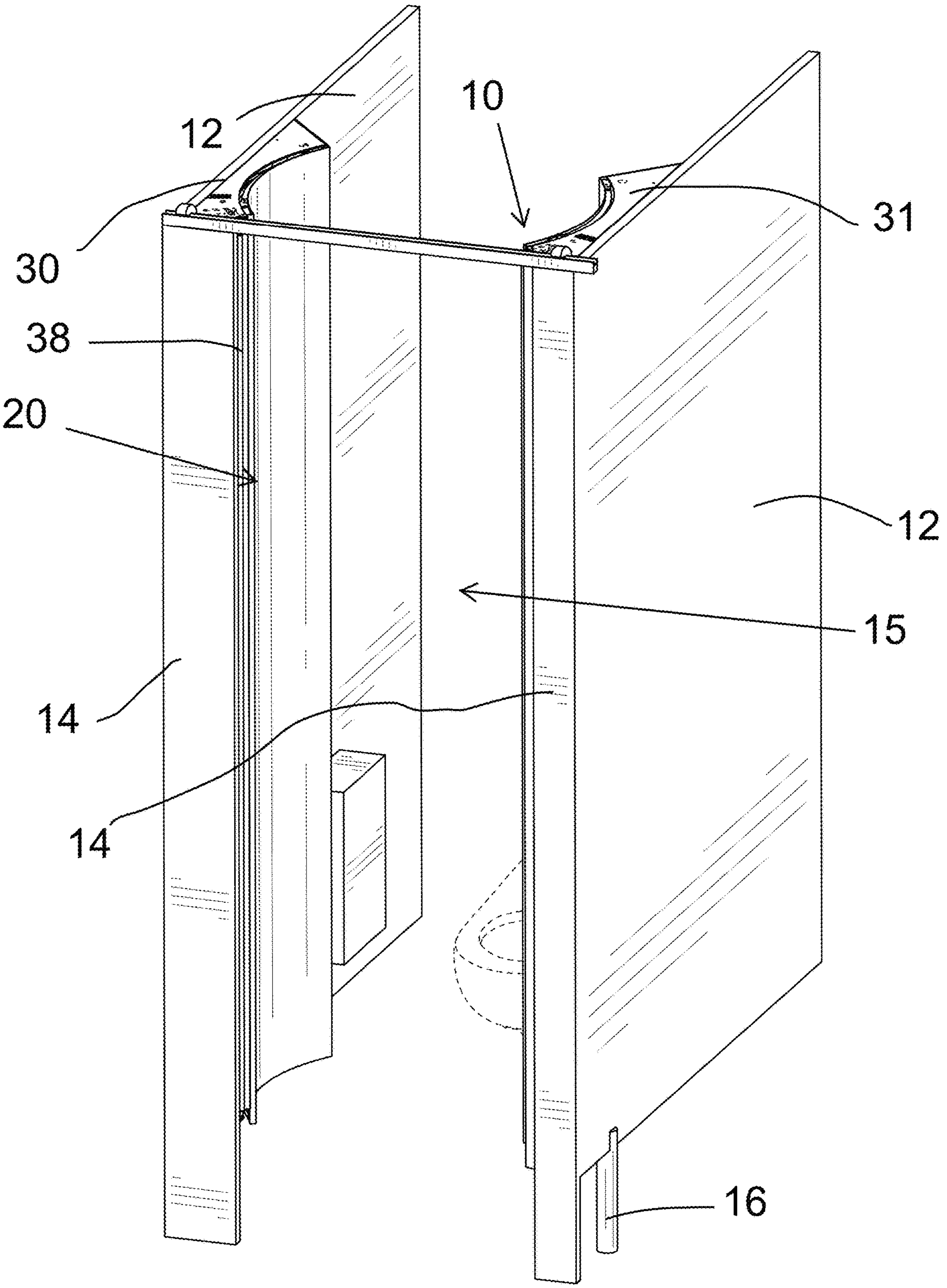
FIG. 1C is a perspective view of the restroom stall and the door assembly of FIG. 1A, with the two doors of the door assembly shown in open positions.
Figure 1D:
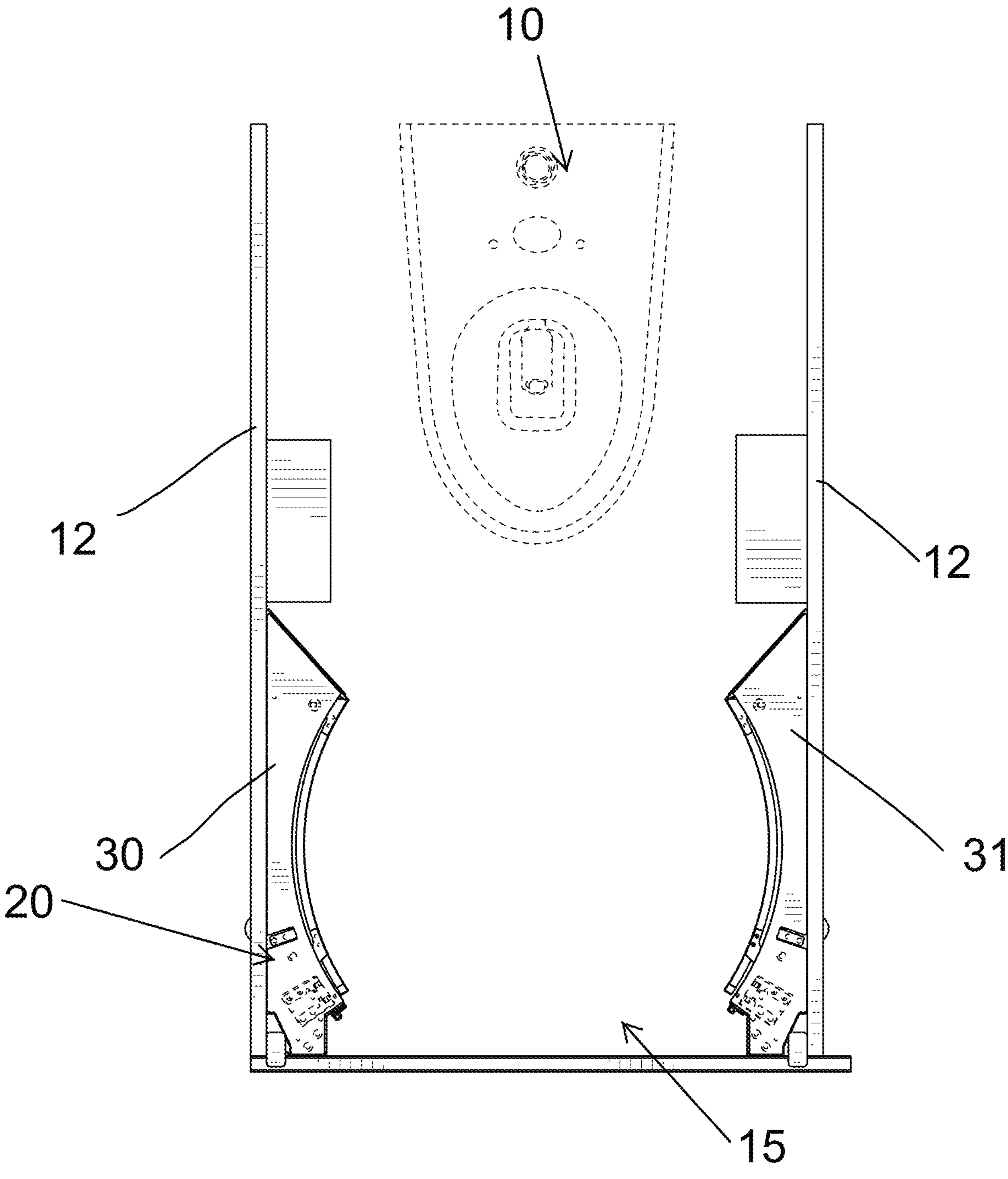
FIG. 1D is a top view of the restroom stall and the door assembly of FIG. 1C.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Figure 2:
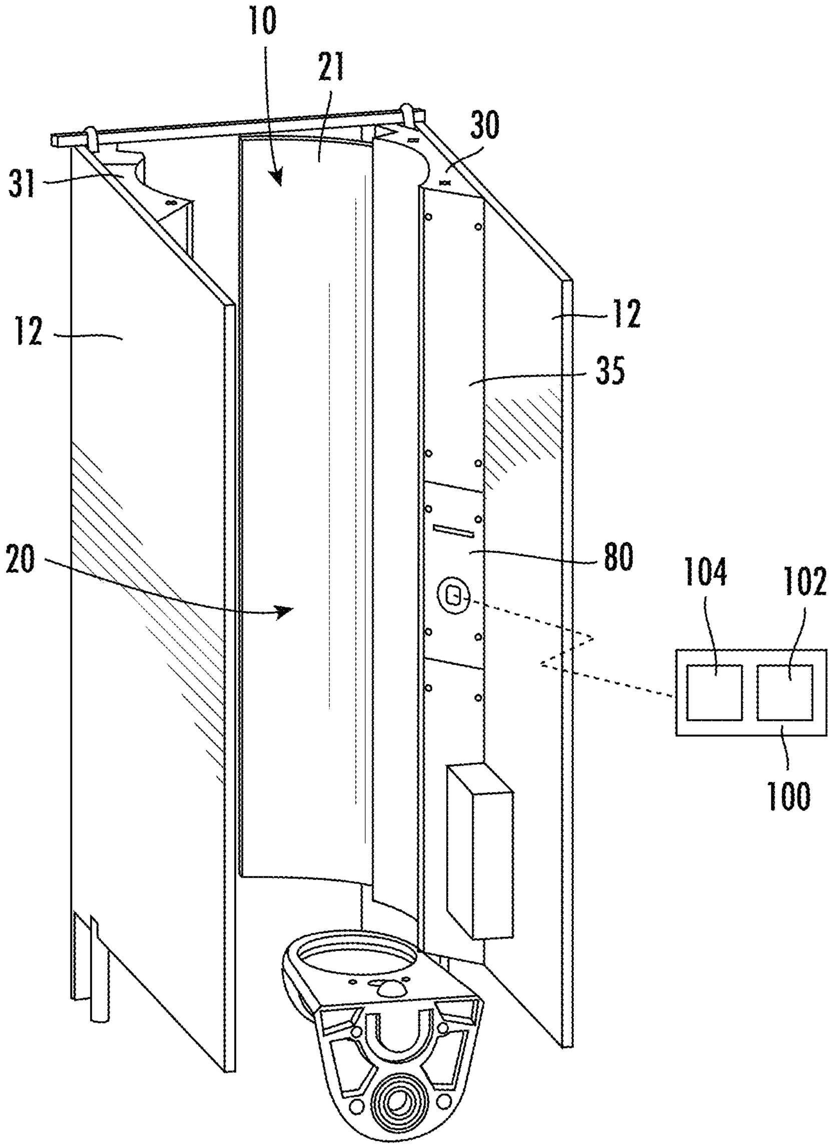
FIG. 2 is a rear perspective view of the restroom stall and the door assembly of FIG. 1A, with one of the doors shown in the open position and one of the doors shown in the closed position.
Figure 3:
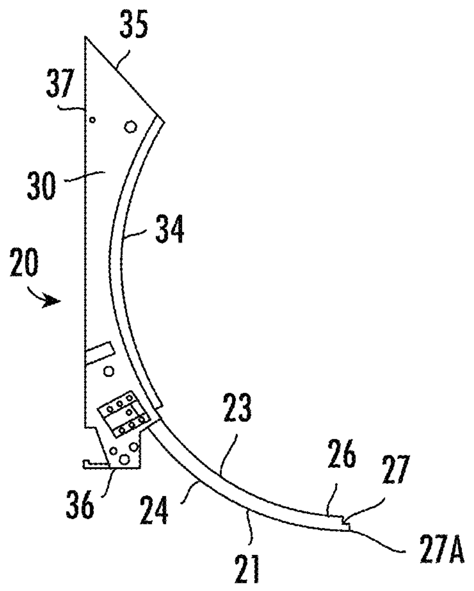
FIG. 3 is a top view of the door assembly of FIG. 2.
Figure 4:
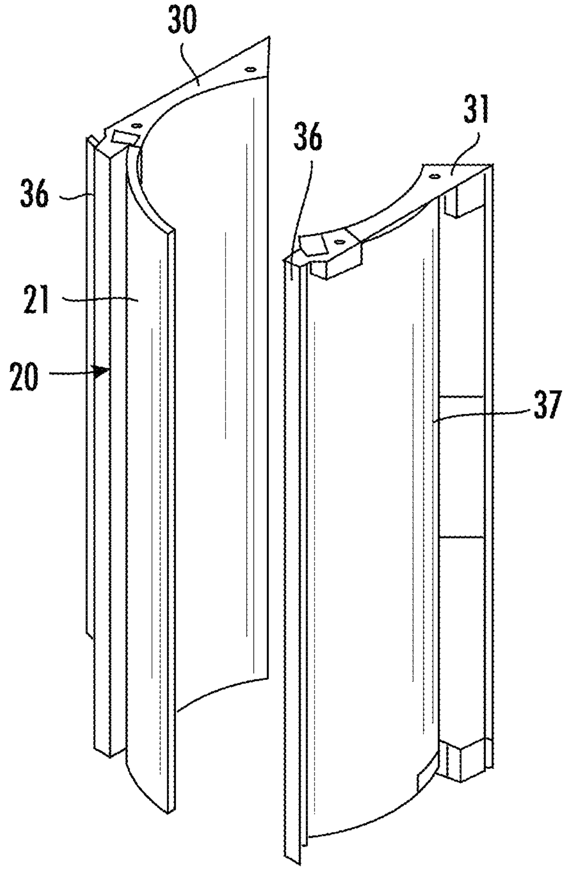
FIG. 4 is a perspective view of the door assembly of FIG. 2.
Figure 5:
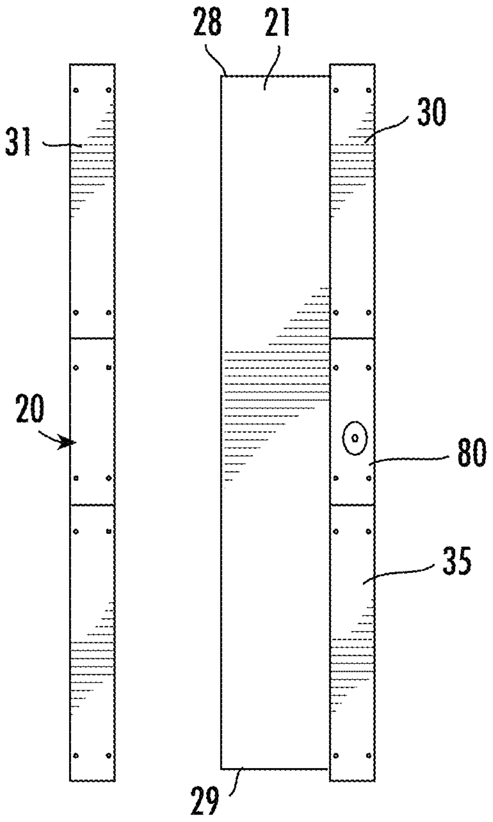
FIG. 5 is a rear view of the door assembly of FIG. 2.
Figure 6:
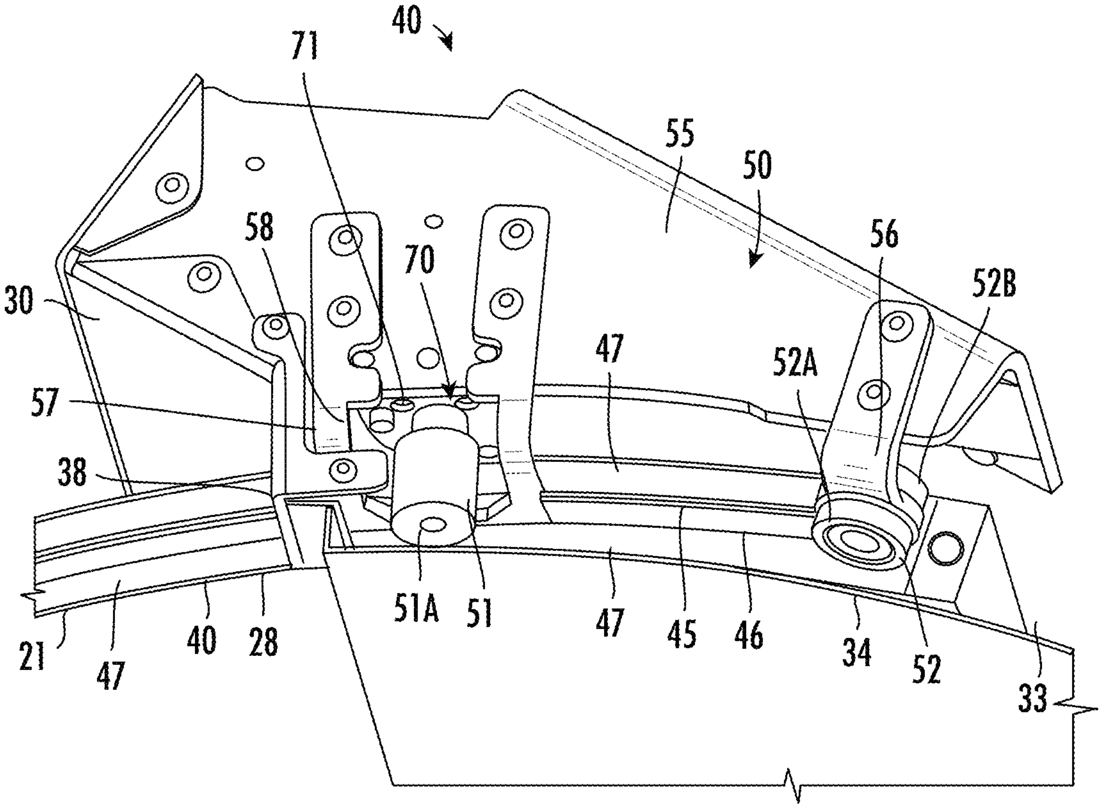
FIG. 6 is a perspective view of internal components of the door assembly of FIG. 2.
Figure 7:
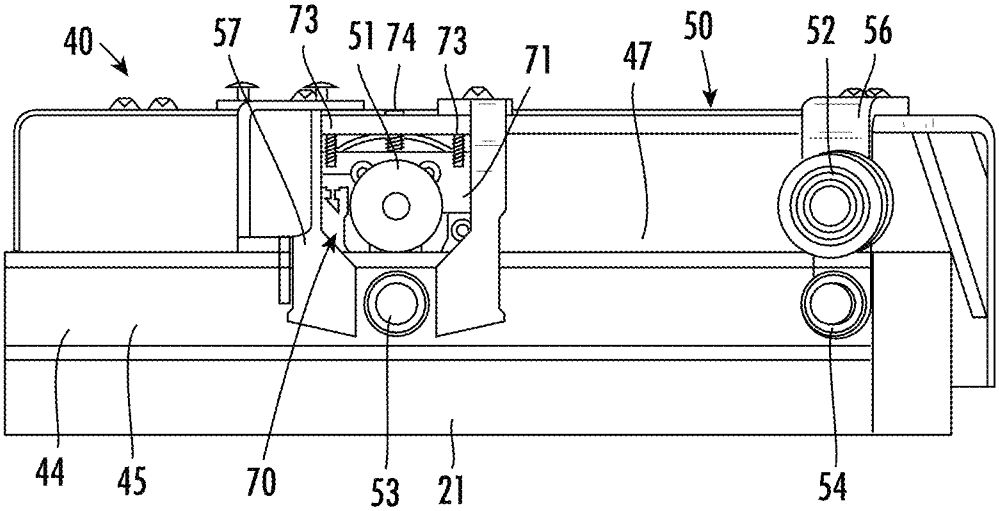
FIG. 7 is a side view of internal components of the door assembly of FIG. 2, with some components shown partially transparent to show internal detail.
Figure 8:
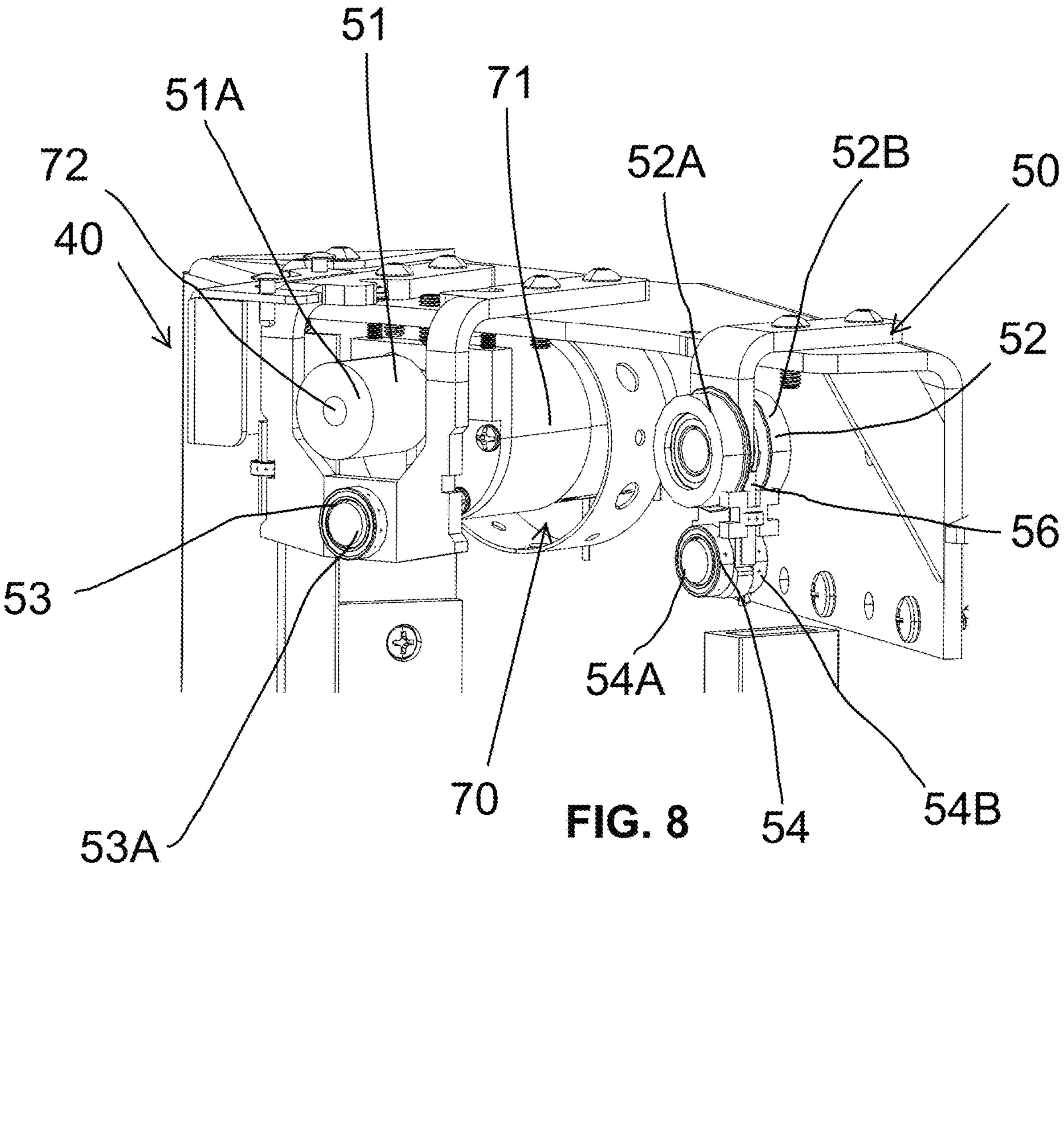
FIG. 8 is a perspective view of internal components of the door assembly of FIG. 2.

Referring to the drawings, and initially to FIGS. 1A-8, there is shown a restroom stall 10 including one embodiment of a door assembly 20 according to aspects of the disclosure. The stall 10 is bounded on opposite sides by boundary walls in the form of partitions 12 that each extend outward from a rear wall to a stile 14 that is oriented transverse to the partition 12. The partitions 12 in this embodiment form side walls of the stall 10, and the stiles 14 each form a portion of a front wall that has a front opening 15 between the stiles 14. It is understood that one or both of the side walls of the stall 10 may be formed by walls of the restroom, depending on the configurations of the room and the stall 10. Likewise, at least a portion of the front wall of the stall 10 may be formed by a wall of the restroom. The partitions 12 in FIGS. 1A-2 are spaced from the floor and the ceiling, and are connected to and supported by the floor via supports or feet 16 that extend from the partitions 12 to the floor. The stiles 14 are also spaced from the ceiling and are connected to and supported by the floor. In other configurations, the partitions 12 and/or the stiles 14 may be connected to and supported by at least one of the floor and the ceiling, either directly or by supports 16. It is understood that the partitions 12 and the stiles 14 may also be spaced from the floor and/or the ceiling in various configurations. The stall 10 houses a toilet 18 that may be mounted on the restroom wall or the floor, as well as other fixtures 19 such as holders for toilet paper, seat covers, or other sanitary products.

The door assembly 20 is mounted within the stall 10, by connection to one or more of the boundary walls. In the embodiment of FIGS. 1A-2, the door assembly 20 is mounted on and supported by the side walls (e.g., the partitions 12 and/or walls of the restroom), such that the door assembly 20 is suspended above the floor of the restroom by the partitions 12. In another embodiment, the door assembly 20 may be at least partially supported by the floor and/or the ceiling, either by direct connection or by use of supports interconnecting the door assembly 20 to the floor and/or the ceiling. The door assembly 20 in FIGS. 1A-8 is also partially supported by the stiles 14.

Figure 15:
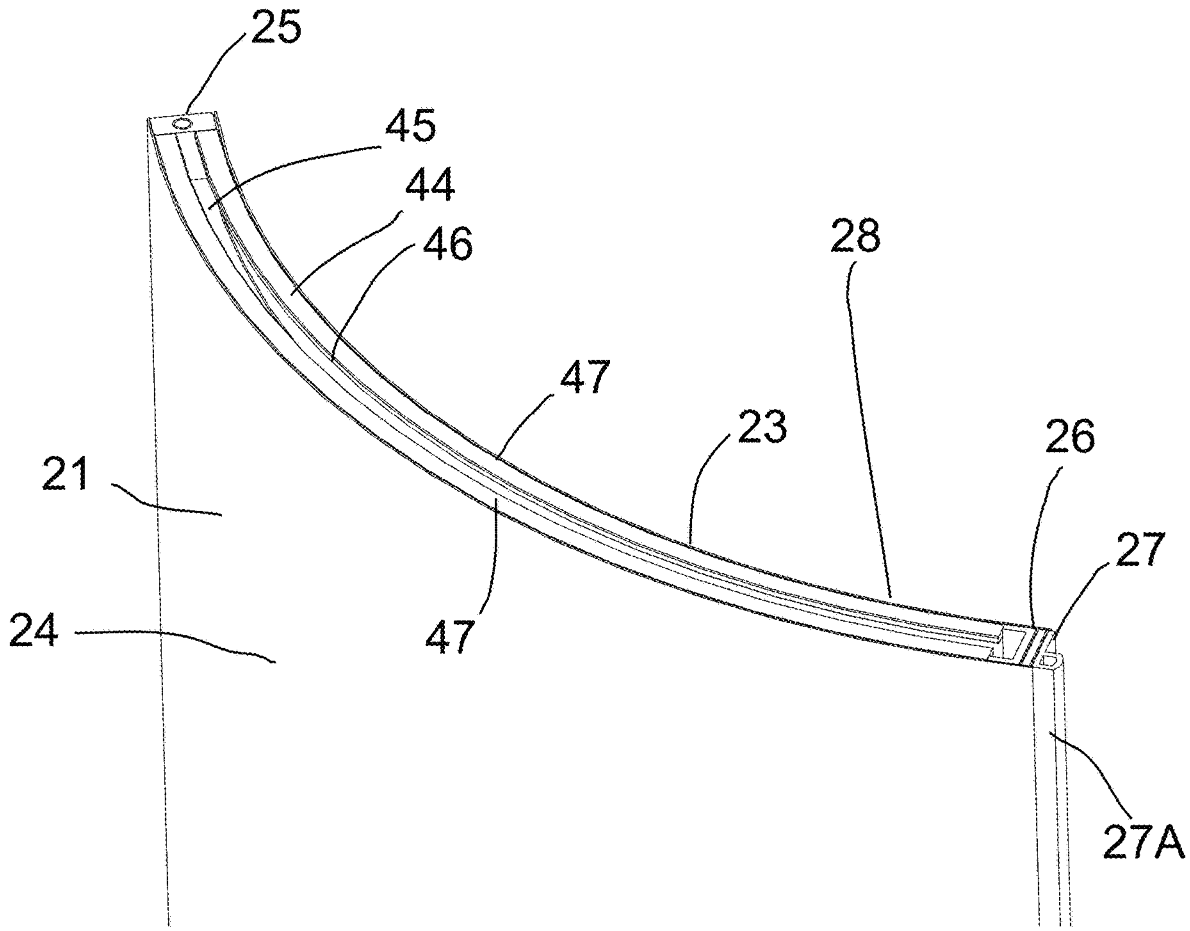
FIG. 15 is a perspective view of one of the doors of the door assembly of FIG. 2.

The door assembly 20 in FIGS. 1A-8 comprises first and second doors 21, 22 that are moveably mounted on first and second housings 30, 31. FIG. 15 illustrates one of the doors 21, 22 of FIGS. 1A-8. The housings 30, 31 include mounting structure for mounting to the boundary walls of the stall 10 (i.e., the partitions 12 and/or the stiles 14), which may include bolts, screws, or other fasteners. The housings 30, 31 also include a concealed wire routing path 32 for routing wires between the left and right housings 30, 31 for power and/or communications. Each of the doors 21, 22 has a curved shape, with an inner surface 23 and an outer surface 24 that extend between an inner end 25 and an outer end 26. In the embodiment of FIGS. 1A-8, each door has a circular arc shape, with the inner surface 23 and the outer surface 24 both having circular arc shapes with different radii of curvature but a common imaginary center point. In this configuration, the distance between the inner and outer surfaces 23, 24 is constant, i.e., the door 21, 22 has a constant thickness. The doors 21, 22 each have a closure member 27 at the outer end 26, such that the closure members 27 are configured to engage each other to ensure that the doors 21, 22 are closed in a manner that does not permit viewing through the juncture between the doors 21, 22. In various embodiments, the closure members 27 may be flexible gaskets that can press against each other, and may also have interlocking and/or overlapping structures. As shown in FIGS. 1A-1D, the closure members 27 have overlapping lips 27A, with one lip 27A positioned on the inner side (proximate the inner surface 23) and the other lip 27A positioned on the outer side (proximate the outer surface 24). The doors 21, 22 are each moveable by translation along an arcing travel path between an open position, where the door 21, 22 is retracted within the respective housing 30, 31, and a closed position, where the door 21, 22 is extended out of the housing 30, 31 to close the stall 10. In the open positions, the doors 21, 22 permit ingress and egress through the front opening 15, and in the closed positions, the doors 21, 22 combine to obstruct the front opening 15. It is understood that a portion of the door 21, 22 may still extend out of the housing 30, 31 in the open position, and a portion of the door 21, 22 is still received within the housing 30, 31 in the closed position.

Each housing 30, 31 includes an inner cavity 33 that receives the respective door 21, 22 and permits the door 21, 22 to travel along the arcing travel path between the open and closed positions. Each cavity 33 has an opening 38 through which the door 21, 22 extends and retracts. The inner cavity 33 of each housing 30, 31 may have an arcing shape similar to the respective door 21, 22 in one embodiment, or may have a more open shape in another embodiment. Each housing 30, 31 in FIGS. 1A-8 includes an inner panel 34 that faces inward into the stall 10 and toward the opposite partition 12, and the inner panels 34 in this embodiment have arc shapes similar to the doors 21, 22. These arc shapes minimize the internal space of the stall 10 occupied by the inner panels 34. The housings 30, 31 also each have a rear panel 35 and may also have a front panel 36. The front panel 36 may not be necessary if the stiles 14 are of sufficient width to cover the entire front of the housing 30, 31. The outer sides 37 of the housings 30, 31 are open and are covered by the side walls (e.g., partitions 12) of the stall 10 due to the mounting configuration, but the housings 30, 31 may have outer panels in another embodiment.

Figure 19:
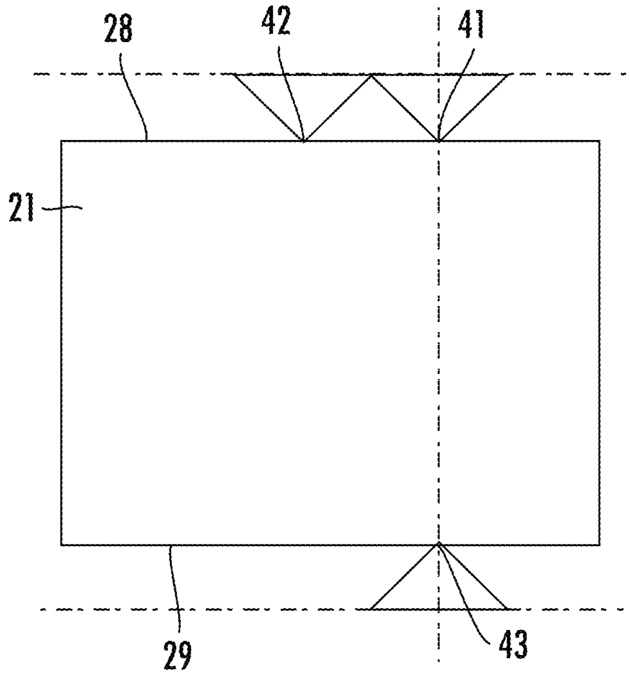
FIG. 19 is a schematic drawing of a mounting configuration for a door of a door assembly according to aspects of the disclosure.

The door assembly 20 further includes a mounting assembly 40 that mounts the doors 21, 22 on the housings 30, 31 in a configuration that guides the doors 21, 22 between the open and closed positions, and a motor system 70 that operates to move the doors 21, 22 between the open and closed positions. The mounting assembly 40 in one general embodiment (see FIG. 19) includes at least three points of contact 41, 42, 43 between the moveable components of the door assembly 20 and the fixed components of the door assembly 20, in order to resist tilting of the doors 21, 22 when the doors 21, 22 are extended out of the housings 30, 31. The points of contact 41, 42, 43 are located at or within the housings 30, 31, and outer ends 26 of the doors 21, 22 are unsupported in the closed positions, and the doors 21, 22 therefore experience a torque that tends to cause the outer ends 26 to tilt or rotate downward. The points of contact 41, 42, 43 all exert a vertical force on the door 21, 22 to resist tilting of the door 21, 22. In one embodiment, the door assembly 20 includes two points of contact 41, 42 at the top 28 of each door 21, 22 and one point of contact 43 at the bottom 29 of each door 21, 22, but this orientation may be reversed in another embodiment. More specifically, the first and third points of contact 41, 43 in the configuration of FIG. 19 exert an upward vertical force on the door 21, 22, and the second point of contact 42 exerts a downward vertical force on the door 21, 22, when the door 21, 22 is in the closed position. In another embodiment, the first point of contact 41 may exert a downward force on the door 21, 22, depending on the configuration of the mounting assembly 40. The points of contact 41, 42, 43 are all configured to be located at or near the inner end 25 of the door 21, 22 when the door 21, 22 is in the closed position.

The mounting assembly 40 in one embodiment may generally include a track 44 fixedly connected to one of the door 21, 22 and the housing 30, 31, and a carriage 50 fixedly connected to the other of the door 21, 22 and the housing 30, 31, such that the track 44 and the carriage 50 are moveably engaged with each other. In general, the component of the track 44 and the carriage 50 that is engaged with the housing 30, 31 is fixed in position during use, and the component of the track 44 and the carriage 50 that is engaged with the door 21, 22 moves with the door 21, 22. In the embodiment of FIGS. 1A-8, each door 21, 22 has a curved track 44 mounted along the top 28, and each housing 30, 31 has a fixed carriage 50 engaged with the housing 30, 31 proximate the opening 38. The track 44 is formed as a curved rectangular tube defining an elongated, curved cavity 45, with an elongated slot 46 defined between two inwardly extending flanges 47. The track 44 in FIGS. 1A-8 is fixedly mounted on the top 28 of the door 21, 22 such that the slot 46 faces upward.

The carriage 50 in FIGS. 1A-8 includes multiple rollers that engage the track 44 and roll with respect to the track 44, including a first roller assembly (or first top roller assembly) 51, a second roller assembly (or second top roller assembly) 52, a third roller assembly (or first bottom roller assembly) 53, and a fourth roller assembly (or second bottom roller assembly) 54. The roller assemblies 51, 52, 53, 54 are all mounted on a carriage frame 55 that is fixedly connected to the housing 30, 31 and may form a portion of the housing 30, 31. The first roller assembly 51 in this embodiment includes a first roller or powered roller 51A that is powered for rotation by connection to the motor system 70 as discussed herein. The powered roller 51A has an outer surface that is both resilient and high-friction to enhance engagement with the door 21, 22, e.g., by being made of natural or synthetic rubber. The powered roller 51A is sufficiently wide to extend across the slot 46 and engage the top/outer sides of both flanges 47 of the track 44. In another embodiment (not shown), the powered roller 51A may have a gear surface, and the track 44 may have a complementary gear surface, creating a rack-and-pinion arrangement for opening and closing the door 21, 22. The second roller assembly 52 includes two free rollers 52A, 52B that are each configured to engage the top/outer side of one of the flanges 47 of the track 44. The third roller assembly 53 includes two free rollers 53A (second roller not shown) that are each configured to engage the bottom/inner side of one of the flanges 47 of the track 44. The fourth roller assembly 54 includes two free rollers 54A, 54B that are each configured to engage the bottom/inner side of one of the flanges 47 of the track 44. The second and fourth roller assemblies 52, 54 are both rotatably mounted on a first leg 56 that is connected to the carriage frame 55 and extends downward from the carriage frame 55, with the second roller assembly 52 positioned above the fourth roller assembly 54. The second rollers 52A, 52B are positioned on opposite sides of the first leg 56, and the fourth rollers 54A, 54B are positioned on opposite sides of the leg 56. The first leg 56 extends downward into the slot 46 in the track 44 so the fourth roller assembly 54 can be positioned within the cavity 45 of the track 44. The third roller assembly 53 is rotatably mounted on a second leg 57 that is connected to the carriage frame 55 and extends downward from the carriage frame 55. The second leg 57 extends around the first roller assembly 51 and has a gap 58 through which the powered roller 51A extends. The second leg 57 extends downward into the slot 46 of the track 44 so the third roller assembly 53 can be positioned within the cavity 45 of the track 44.

In the configuration of FIGS. 1-8A, the first and second roller assemblies 51, 52 exert a downward force on the track 44 and the door 21, 22, and the third and fourth roller assemblies 53, 54 exert upward forces on the track 44 and the door 21, 22. The first and third roller assemblies 51, 53 form the first point of contact 41 with the door 21, 22, and the second and fourth roller assemblies 52, 54 form the second point of contact 42 with the door 21, 22 in this configuration. Depending on the position of the door 21, 22, the first, second, third, and/or fourth roller assemblies 51, 52, 53, 54 may be actively exerting force on the door 21, 22, and the roller assemblies 51, 52, 53, 54 may exert different forces on the door 21, 22 based on the position of the door 21, 22. For example, when the door 21, 22 is in the open position, the second point of contact 42 may be exerting an upward force on the door 21, 22, such that the fourth roller assembly 54 exerts the primary force on the door 21, 22 compared to the second roller assembly 52. This may be reversed when the door 21, 22 is in the closed position. The roller assemblies 51, 52, 53, 54 not exerting primary stabilizing forces on the door 21, 22 may also have a stabilizing effect on the door 21, 22 to resist tilting, depending on the position of the door 21, 22. It is understood that all of the roller assemblies 51, 52, 53, 54 may exert lateral forces on the track 44 and the door 21, 22 for further stabilization.

Figure 10:
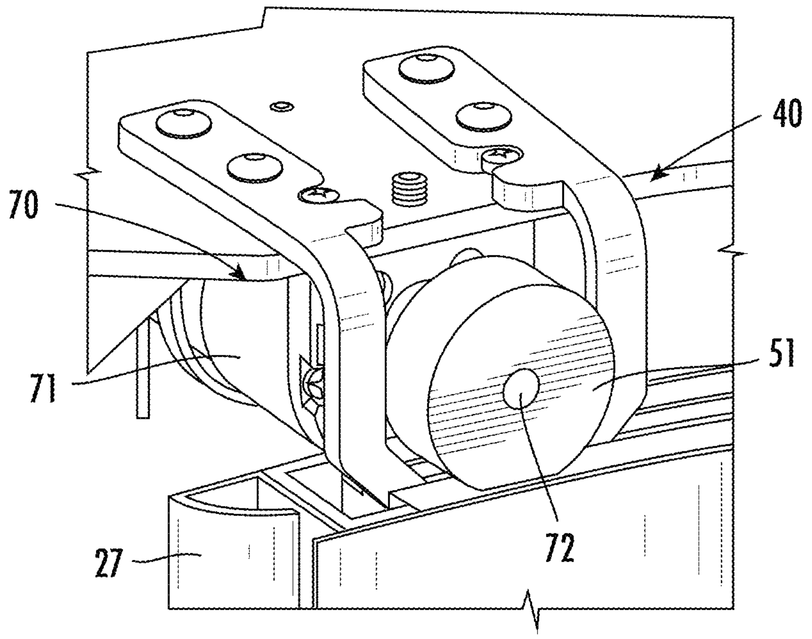
FIG. 10 is a perspective view of some of the internal components of FIG. 9.
Figure 11:
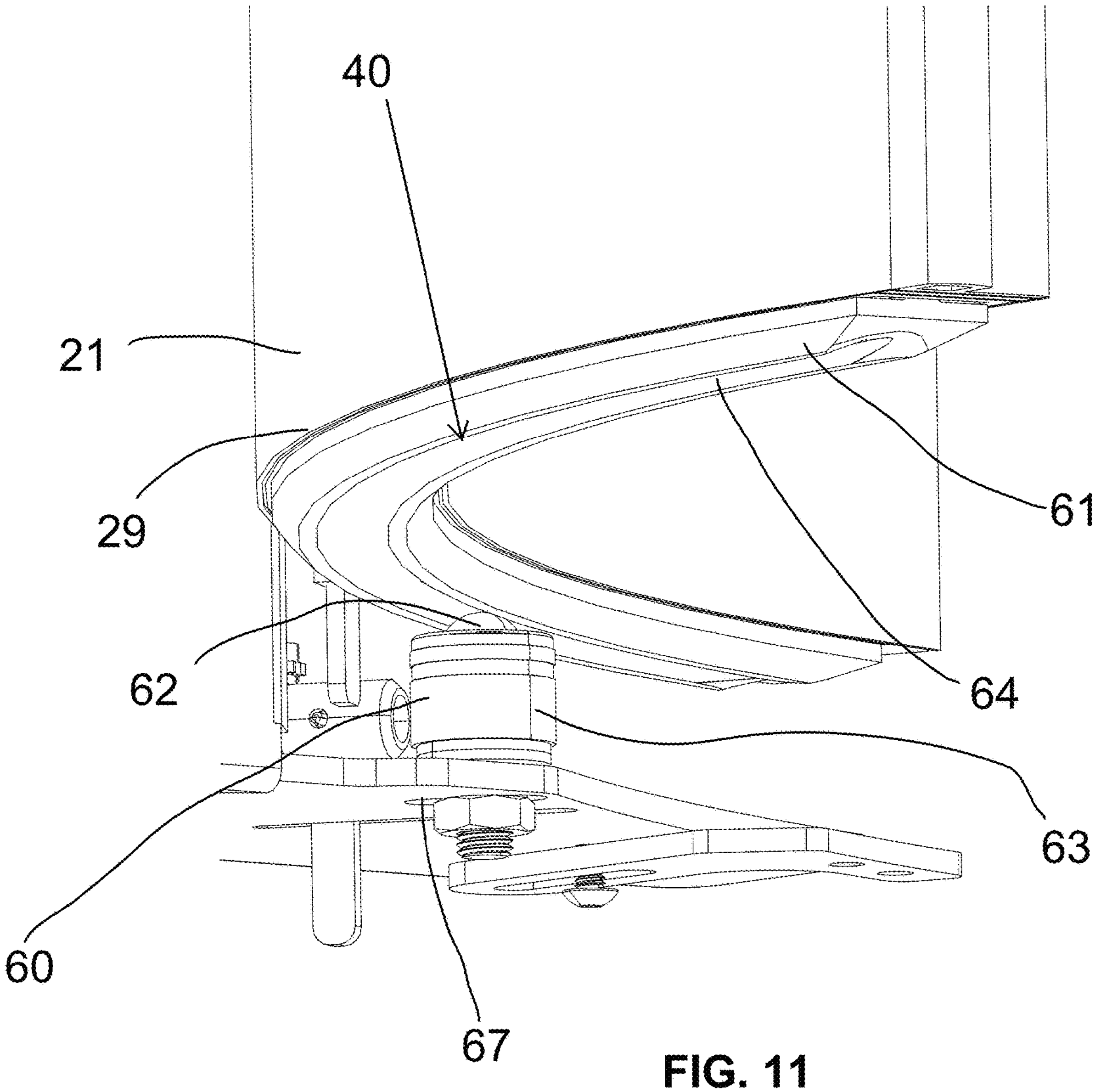
FIG. 11 is a perspective view of additional internal components of the door assembly of FIG. 2.
Figure 12:
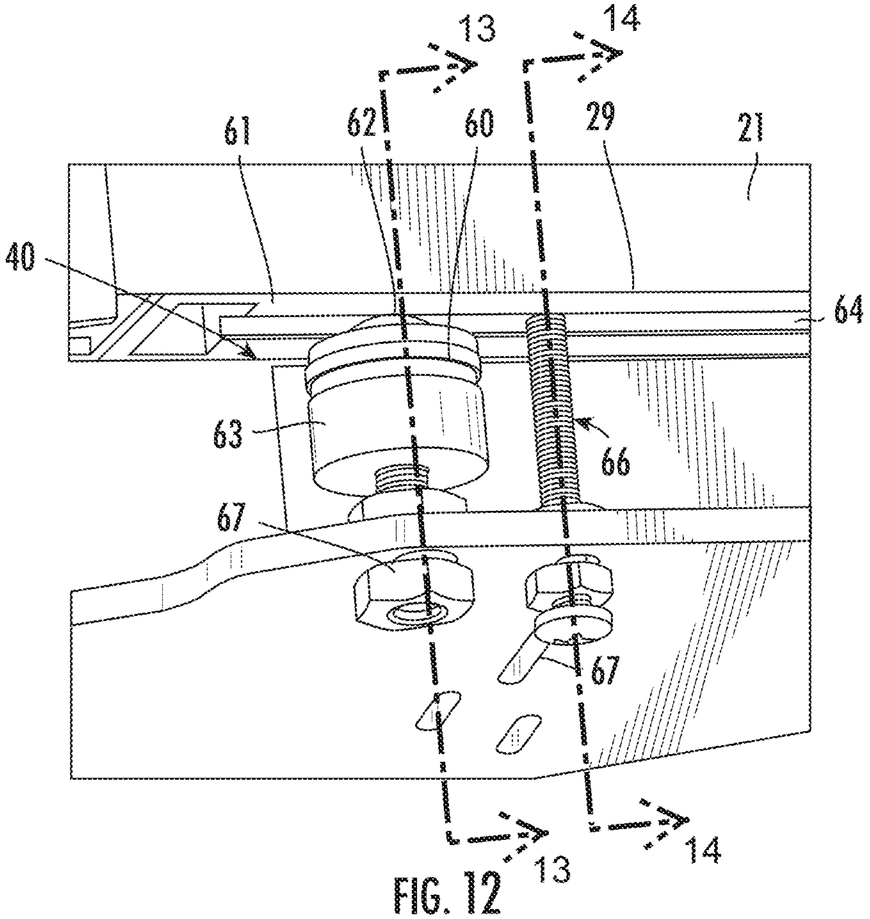
FIG. 12 is a perspective view of additional internal components of the door assembly of FIG. 9.
Figure 13:
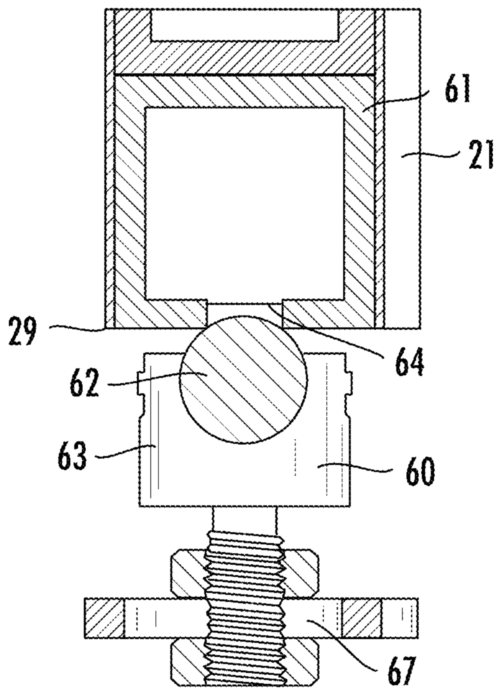
FIG. 13 is a cross-sectional view taken along lines 13-13 in FIG. 12.
Figure 14:
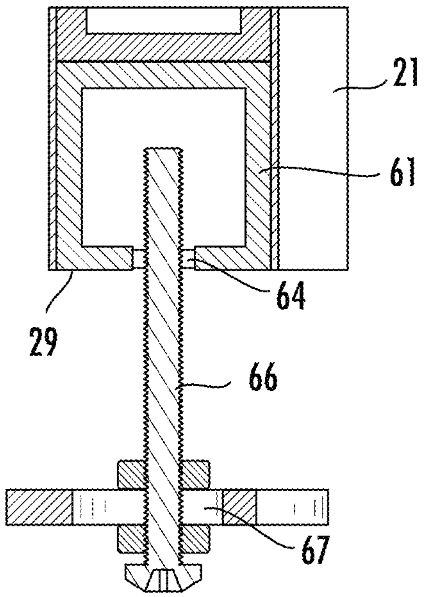
FIG. 14 is a cross-sectional view taken along lines 14-14 in FIG. 12.

The mounting assembly 40 in FIGS. 1A-8 also includes a bottom support in the form of a bottom roller 60 that engages a bottom track 61 at the bottom 29 of the door 21, 22 to form the third point of contact 43, embodiments of which are illustrated in FIGS. 11-14. The bottom roller 60 in FIGS. 1A-8 is in the form of a rolling ball 62 positioned within a casing 63 that permits universal rotation of the ball 62. The ball 62 rides within a slot 64 in the track 61 and exerts at least an upward force on the door 21, 22 when the door 21, 22 is in the closed position. The ball 62 may exert a lateral stabilizing force on the door 21, 22 as well. The slot 64 in FIG. 11 is in the form of a closed groove, and the slot 64 in FIGS. 12-14 is an opening extending into a cavity 65, similar to the configuration of the track 44 in FIGS. 1-8A. The mounting assembly 40 in FIGS. 12-14 further includes a fixed post 66 (in the form of a screw in this embodiment) that also extends into the slot 64. The fixed post 66 is configured to exert a lateral stabilizing force on the bottom track 61 in the event that a lateral force is exerted on the door 21, 22, such as by being bumped by a user, to prevent separation of the door 21, 22 from the mounting assembly 40. The bottom rollers 60 in FIGS. 11-14 and the fixed post 66 in FIGS. 12-14 are mounted on elongated holes 67 to permit lateral position adjustment of these components to ensure proper positioning for the door 21, 22. It is understood that the embodiments illustrated in FIGS. 11-14 may be used in connection with any other embodiment of a mounting assembly 40 described herein, including any of the top support portions of the mounting assembly 40 shown in FIGS. 1A-10 and 20-22.

The motor assembly 70 in FIGS. 1A-8 includes a motor 71 that is mounted on the housing 30, 31, e.g., by mounting to the carriage frame 55, and has a rotary shaft 72. The motor 71 may be an electric motor 71 in one embodiment. The rotary shaft 72 is engaged with the first roller assembly 51 to rotate the powered roller 51A to power movement of the door 21, 22. The motor assembly 70 in FIGS. 1A-8 also includes a vertical adjustment mechanism including two position adjustment screws 73 that are rotatable to vertically adjust the position of the motor 71 with respect to the door 21, 22, to ensure proper positioning and to accommodate wear on the powered roller 51A that may occur in the course of use. A locking screw 74 also engages the motor 71 to hold the motor 71 in the adjusted position. In another embodiment, the motor assembly 70 may include additional rotary motors that may engage other rollers for powering movement of the doors 21, 22. In a further embodiment, a different type of motor may be used, such as a piston-type or reciprocating motor or other motor that creates powered translational movement. In a still further embodiment, the motor may be configured for moving the door 21, 22 only in a single direction, and the door assembly 20 may further include a biasing mechanism, such as a spring or spring-like device, to exert an opposed force on the door 21, 22.

Figure 9:
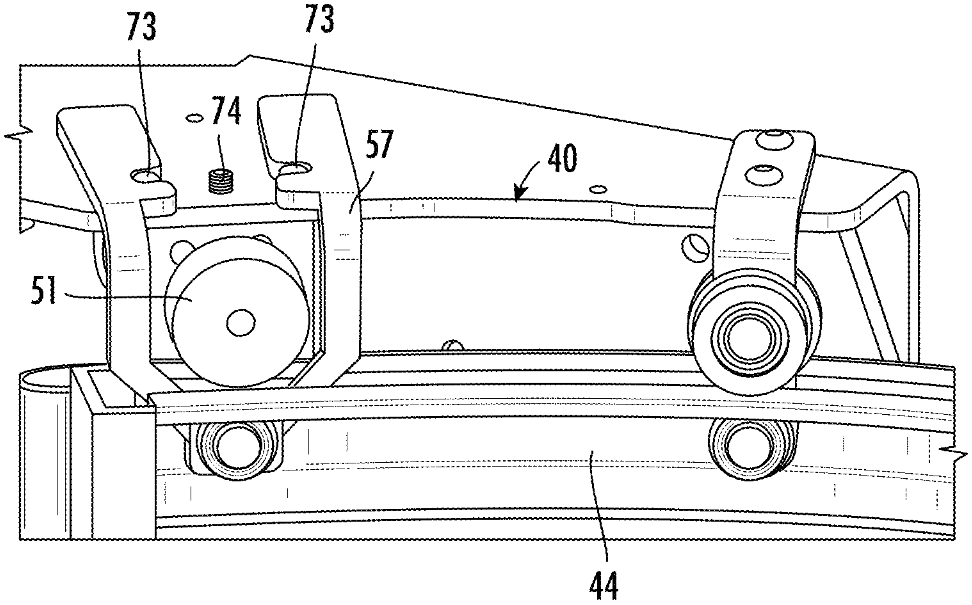
FIG. 9 is a perspective view of internal components of another embodiment of a door assembly according to aspects of the disclosure.

FIGS. 9 and 10 illustrate another embodiment of a mounting assembly 40 and a motor assembly 70 that are similar in structure and function to the mounting assembly 40 and the motor assembly 70 of FIGS. 1A-8. The components shown in FIGS. 9 and 10 are identified by the same reference numbers used in FIGS. 1A-8 and are not described again in detail herein for the sake of brevity.

Figure 20:
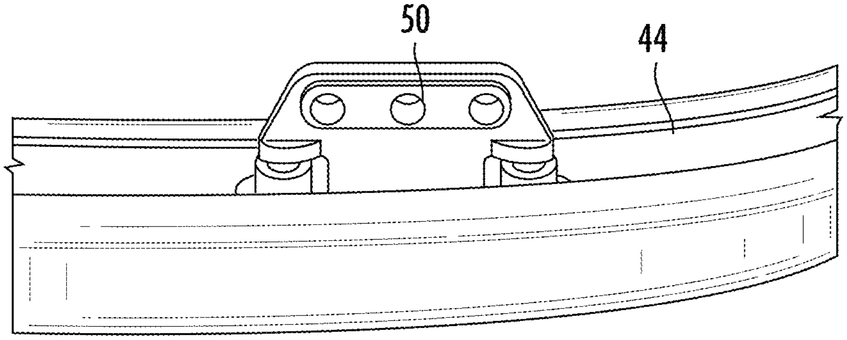
FIG. 20 is a photograph of one embodiment of a track and carriage for mounting a door according to aspects of the disclosure.
Figure 21:
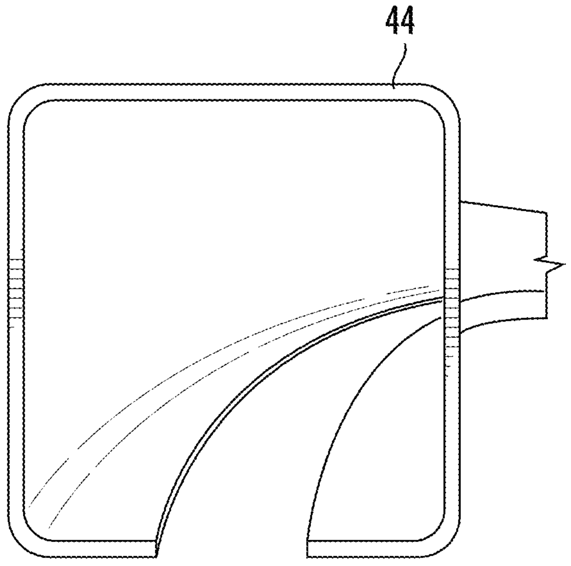
FIG. 21 is a photograph of the track of FIG. 20.

FIGS. 20-21 illustrate another embodiment of a mounting assembly 40 in which the positions of the track 44 and the carriage 50 are transposed with respect to the embodiment of FIGS. 1-8A. In this configuration, the track 44 is fixedly mounted on the housing 30, 31, and the carriage 50 is fixedly mounted on the door 21, 22, such that the carriage 50 rides along the track 44 when the door 21, 22 moves from the open position to the closed position. The track 44 in FIGS. 20-21 is configured similarly to the track 44 in FIGS. 1A-8, but is positioned with the slot 46 facing downward instead of upward as in FIGS. 1A-8. The track 44 is numbered with similar reference numbers in FIGS. 20-21 and is not described again in detail for the sake of brevity. The carriage 50 in FIGS. 20-21 includes multiple rollers that engage the track 44 and roll with respect to the track 44. The rollers are not shown in FIGS. 20-21, but it is understood that the carriage 50 includes at least a first roller assembly including at least one first roller and a second roller assembly including at least one second roller that engage the top/inner sides of the flanges 47 of the track 44 to suspend the carriage 50 from the track 44. The first and second roller assemblies in this embodiment form the first and second points of contact 41, 42 with the door 21, 22. The roller assemblies may be configured similarly to the roller assemblies 51, 52, 53, 54 in FIGS. 1-8A, and it is understood that the motor assembly 70 may be coupled to one of the roller assemblies, such that the roller assembly operates as a drive or powered roller. In another embodiment, the door assembly 20 may have a separately connected motor assembly 70, such as a rotary motor connected to a drive wheel located separately from the mounting assembly 40, a translational drive motor, or other configuration.

Figure 22:
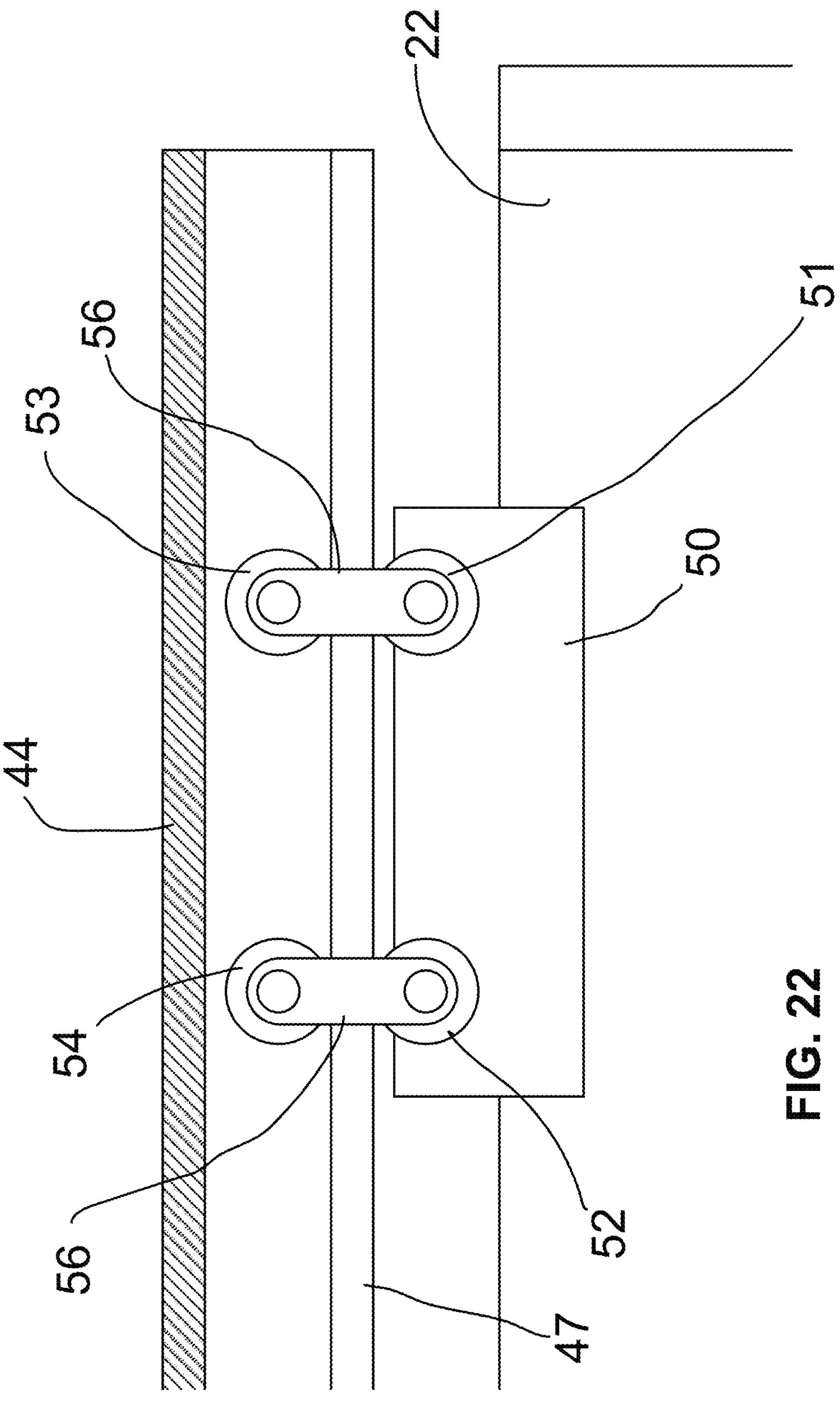
FIG. 22 is a schematic drawing of another embodiment of a track and carriage for mounting a door according to aspects of the disclosure.

FIG. 22 illustrates another embodiment of a mounting assembly 40 in which the positions of the track 44 and the carriage 50 are transposed with respect to the embodiment of FIGS. 1-8A. In this configuration, the track 44 is fixedly mounted on the housing 30, 31, and the carriage 50 is fixedly mounted on the door 21, 22, such that the carriage 50 rides along the track 44 when the door 21, 22 moves from the open position to the closed position. The track 44 in FIG. 22 is configured similarly to the track 44 in FIGS. 1A-8, but is positioned with the slot 46 facing downward instead of upward as in FIGS. 1A-8. The track 44 is numbered with similar reference numbers in FIG. 22 and is not described again in detail for the sake of brevity. The carriage 50 in FIG. 22 includes multiple rollers that engage the track 44 and roll with respect to the track 44, including a first roller assembly (or first top roller assembly) 51, a second roller assembly (or second top roller assembly) 52, a third roller assembly (or first bottom roller assembly) 53, and a fourth roller assembly (or second bottom roller assembly) 54. The roller assemblies 51, 52, 53, 54 are all mounted on a carriage frame 55 that is fixedly connected to the door 21, 22 and may form a portion of the door 21, 22. As shown in FIG. 20, the carriage frame 55 includes at least one leg 56 that extends downward through the slot 46 in the track 44, to permit the third and fourth roller assemblies 53, 54 to be positioned within the cavity 45 of the track 44 and to engage the top/inner side(s) of the flange(s) 47 of the track 44. The first and second roller assemblies 51, 52 engage the bottom/outer side(s) of the flange(s) 47 in this configuration. In this embodiment, the third roller assembly 53 forms the first point of contact 41, and the second roller assembly 52 forms the second point of contact 42, between the door 21, 22 and the housing 30, 31.

In a further embodiment, the track 44 may have a rotatable mechanism such as rollers or bearings, and the carriage 50 may slide along the track 44 during movement of the track 44 or the carriage 50. In this configuration, the carriage 50 may include one or more sliders configured to engage the rotatable mechanism of the track 44. In yet another embodiment, neither the carriage 50 nor the track 44 has a rotatable mechanism, and a sliding mechanism may be used. For example, the carriage 50 may have lubricated, low-friction sliders that are engaged within the cavity 45 of the track 44 and slide along the track 44.

Figure 16:
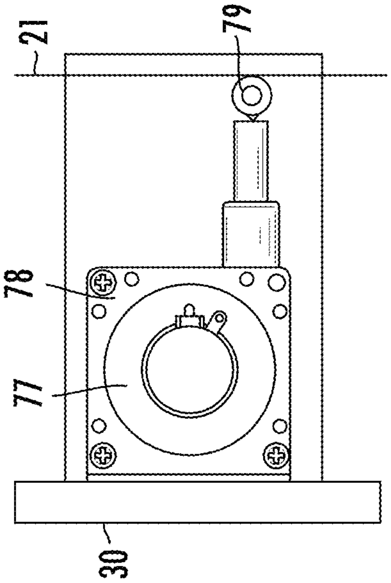
FIG. 16 is a side view of a string potentiometer configured for use with the door assembly of FIG. 2, shown in a retracted position.
Figure 17:
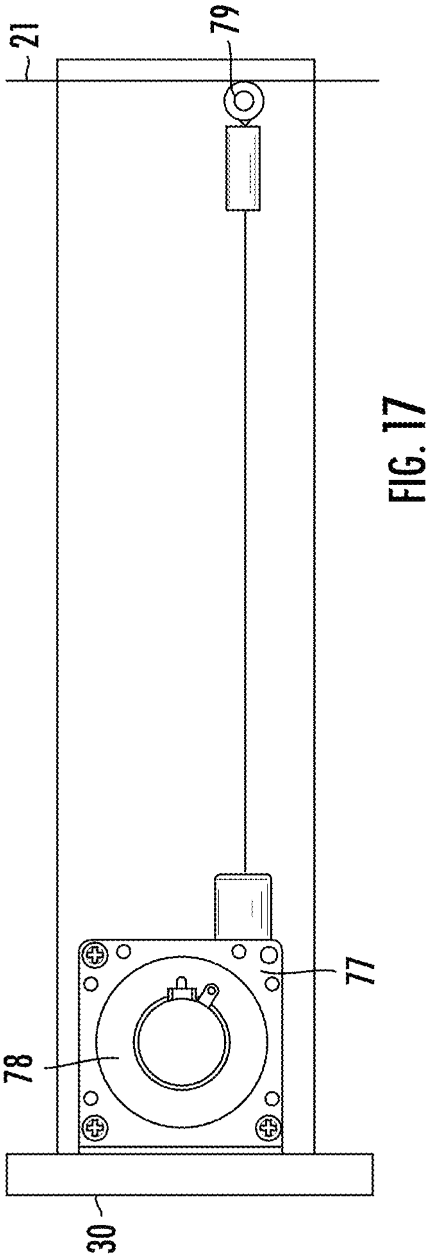
FIG. 17 is a side view of the string potentiometer of FIG. 16, shown in an extended position.
Figure 29:
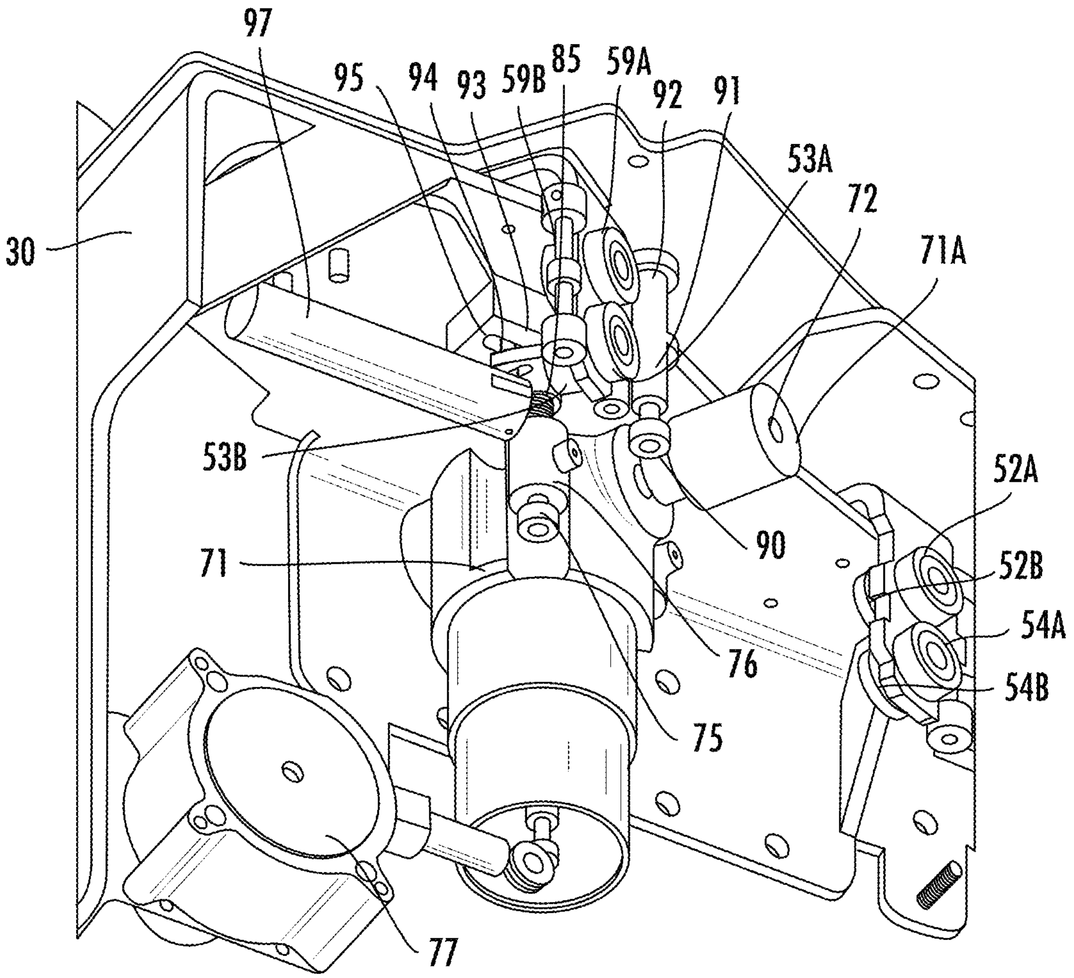
FIG. 29 is a perspective view of internal components of the door assembly of FIG. 27.

In one embodiment, the door assembly 20 may have one or more sensors for tracking the position of the door 21, 22 with respect to the housing 30, 31. FIGS. 16-17 illustrate an embodiment of a position sensor 77 in the form of a string potentiometer. The position sensor 77 includes a sensor unit 78 connected to a portion of the housing 30, 31 and a connection string 79 that is connected to the door 21, 22. When the door 21, 22 moves with respect to the housing 30, 31, the connection string 79 is pulled out of the sensor unit 78, and the sensor unit 78 reads the change in position of the door 21, 22 through a change in electrical potential. It is understood that the positioning of the position sensor 77 in FIGS. 16-17 may be transposed, with the sensor unit 78 connected to the door 21, 22 and the connection string 79 connected to the housing 30, 31. FIG. 29 illustrates one embodiment of a mounting configuration for a position sensor 77 as shown in FIGS. 16-17. Other types and arrangements of position sensors 77 may be used in other embodiments.

Figure 18:
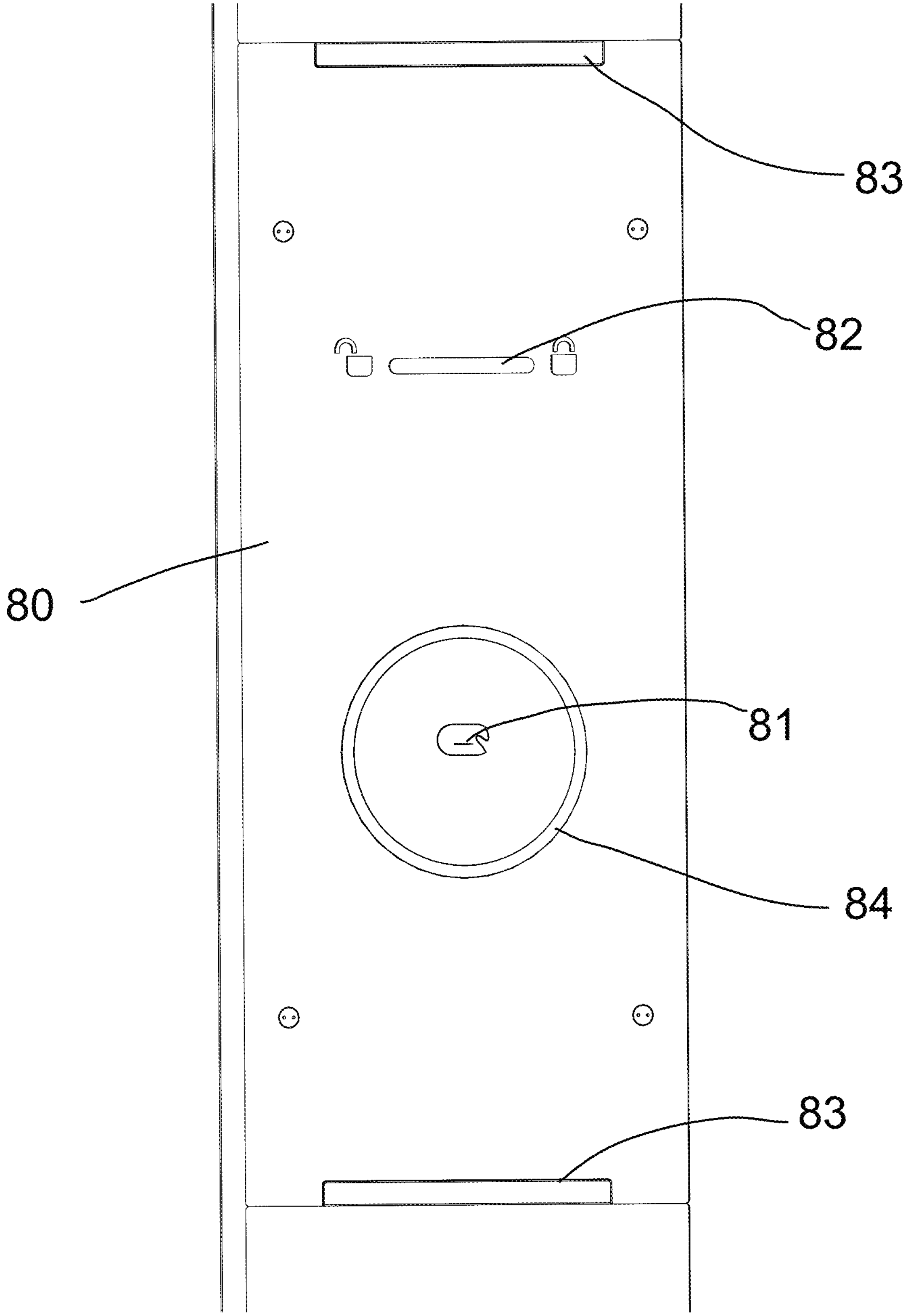
FIG. 18 is a plan view of a sensor assembly of the door assembly of FIG. 2.

The door assembly 20 in FIGS. 1A-8 also includes a sensor panel 80 configured to receive input from a user to open and close the door 21, 22, which is illustrated in greater detail in FIG. 18. The sensor panel 80 includes a sensor assembly with at least a first sensor 81 that senses the presence of a user's hand immediately in front of the sensor panel 80. The sensor panel 80 is configured to sense the presence of the user's hand for a set time period to prevent inadvertent opening or closing of the doors 21, 22. The sensor panel 80 also includes an illuminated indicator 82 configured to indicate to the user the progress in opening and closing the doors 21, 22, i.e., the proportion of the set time period that is required for the user's hand to be held in position in front of the first sensor 80.

Figure 24:
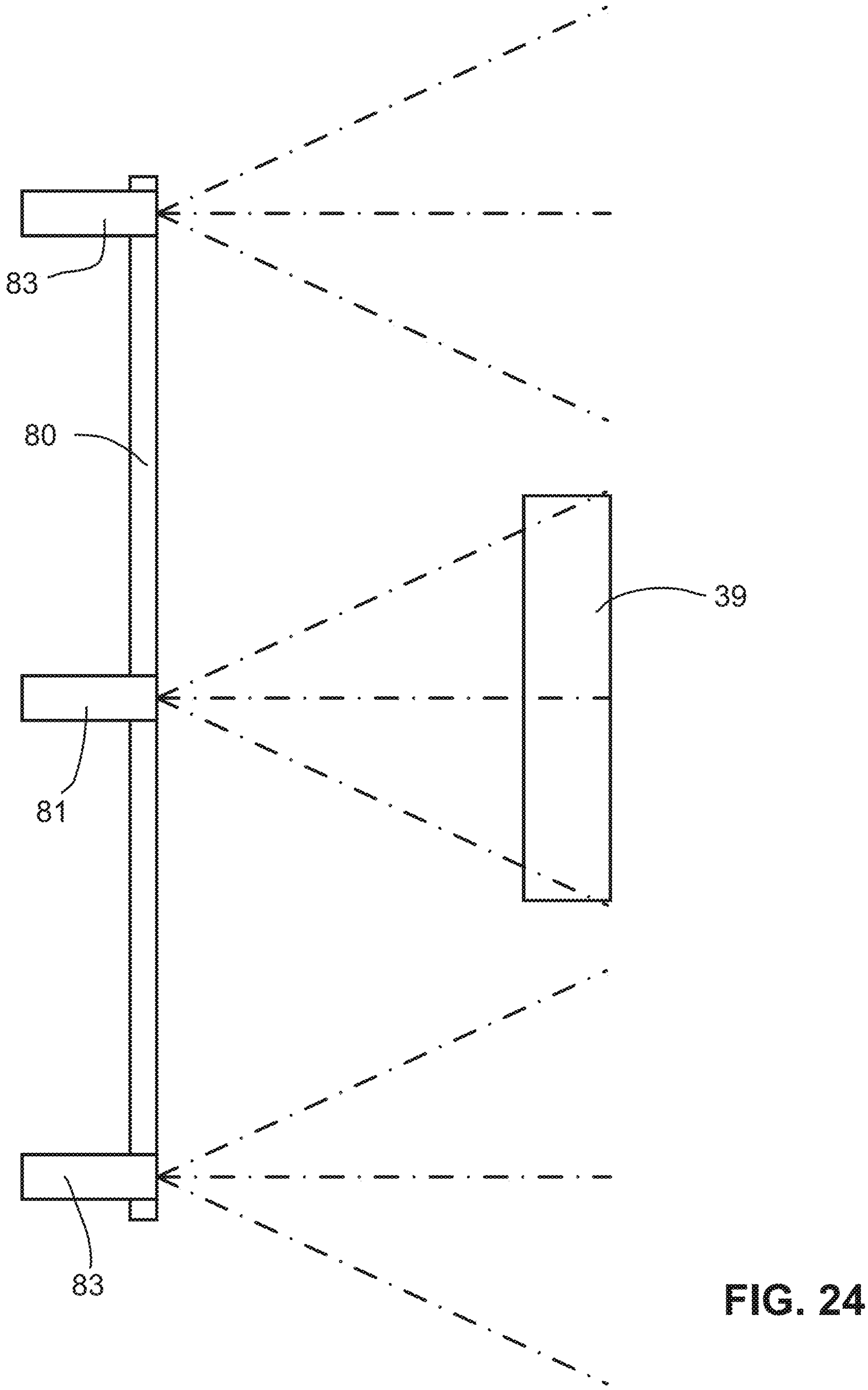
FIG. 24 is a schematic view of one embodiment of operation of the sensor assembly of FIG. 18 according to aspects of the disclosure.
Figure 25:
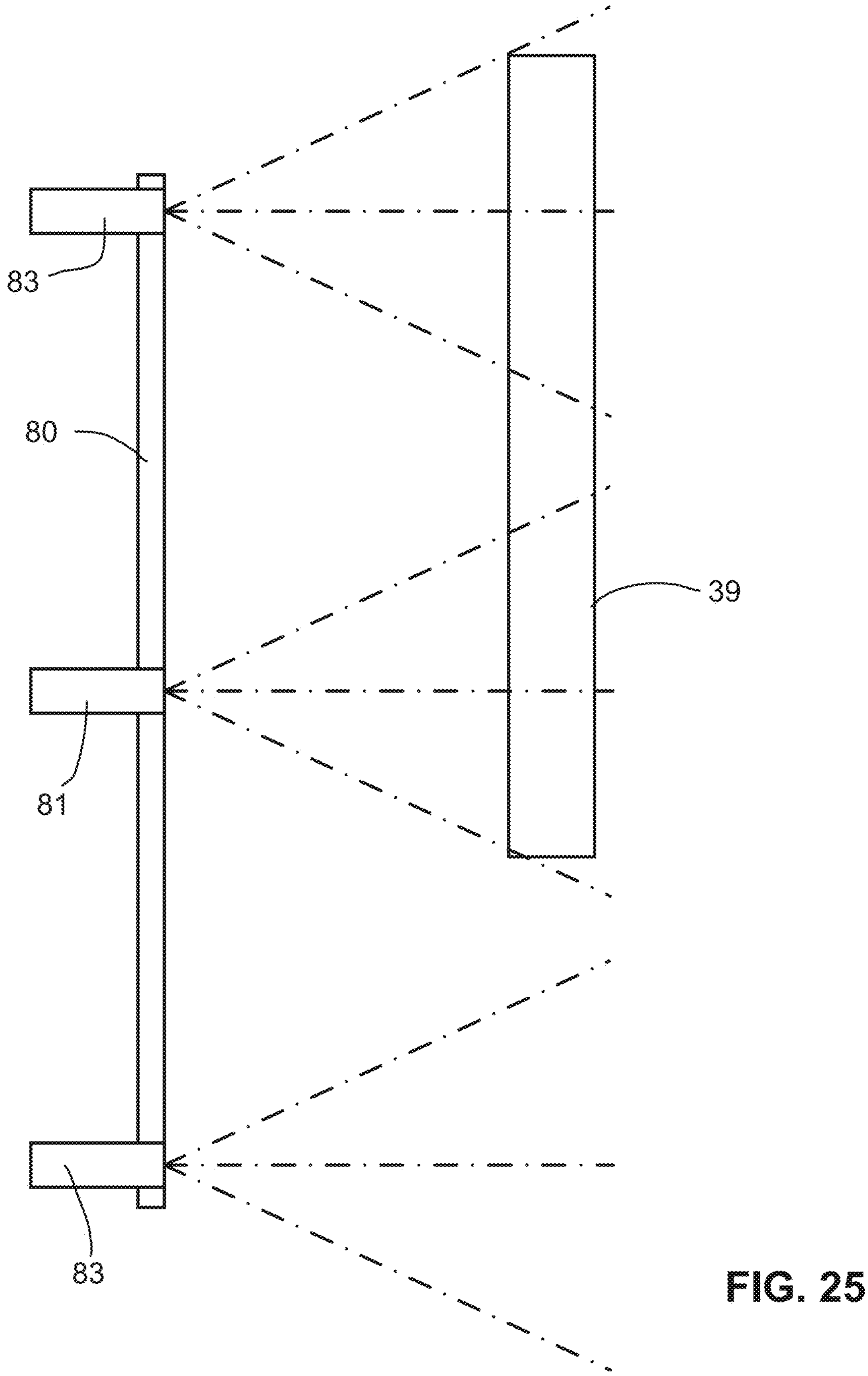
FIG. 25 is a schematic view of another embodiment of operation of the sensor assembly of FIG. 18 according to aspects of the disclosure.
Figure 26:
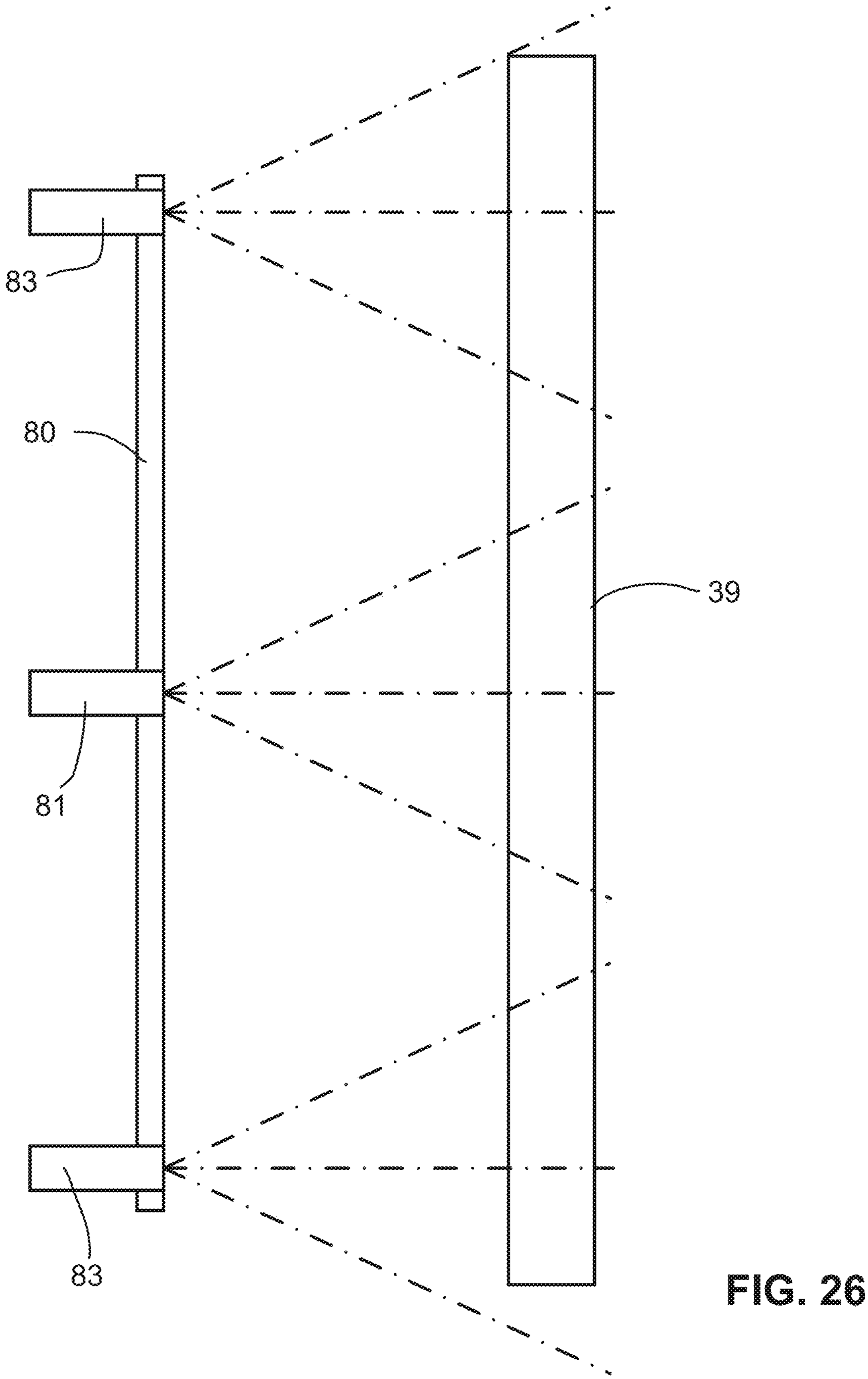
FIG. 26 is a schematic view of another embodiment of operation of the sensor assembly of FIG. 18 according to aspects of the disclosure.
Figure 27:
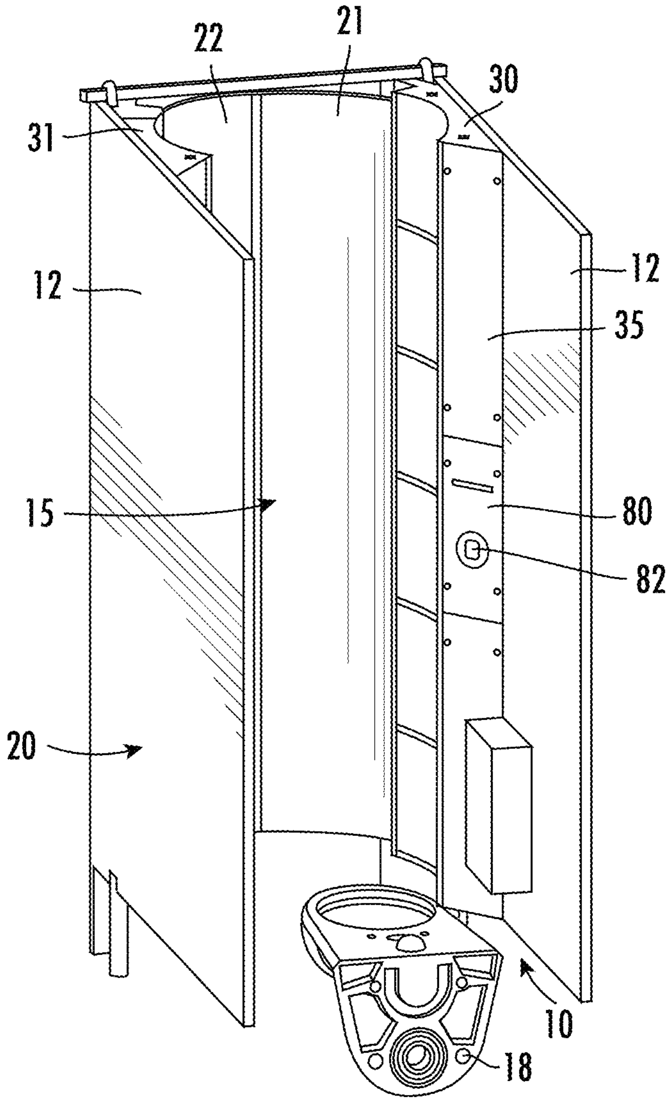
FIG. 27 is a perspective view of another embodiment of a door assembly according to aspects of the disclosure.
Figure 28:
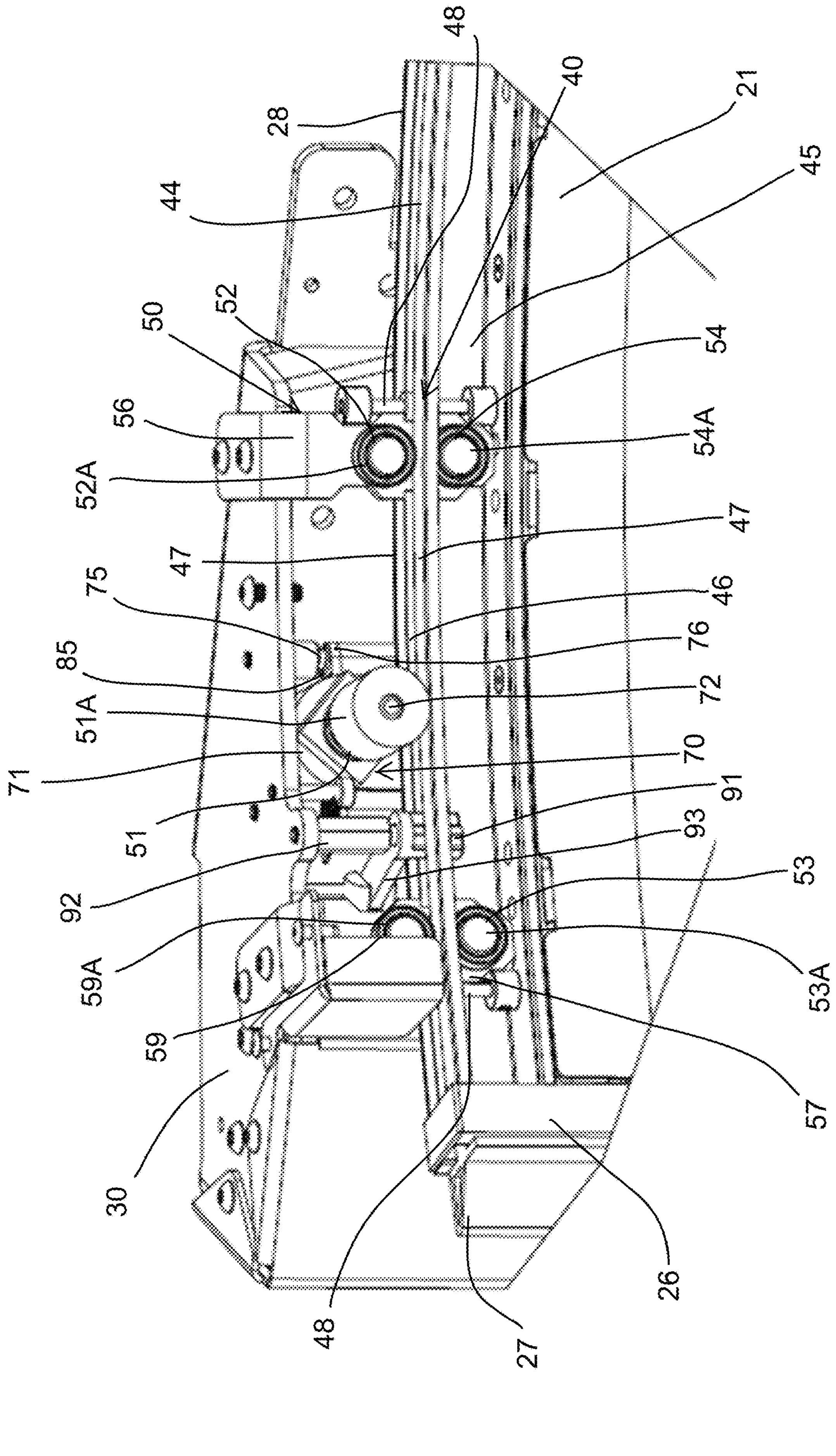
FIG. 28 is a perspective view of internal components of the door assembly of FIG. 27.

The sensor assembly of the sensor panel 80 also includes at least one safety sensor 83 that is displaced from the first sensor 81. The safety sensor 83 is also a position sensor, and is configured for use in determining whether the first sensor 81 is being activated by the user's hand or inadvertently being activated by the user's body. The embodiment in FIG. 18 includes two safety sensors 83 that are vertically displaced from the first sensor 81 a sufficient distance that a user's hand cannot activate all three sensors 81, 83. An example of operation of the sensor assembly with the first sensor 81 and the two safety sensors 83 is shown in FIGS. 24-26. If only the first sensor 81 is activated, e.g., by detecting the presence of a portion 39 of the user's body as in FIG. 24, the door assembly 20 will activate opening or closing of the doors 21, 22. If all of the first sensor 81 and the safety sensor(s) 83 are activated as in FIG. 26, the data indicates that the user's body is inadvertently activating the sensors 81, 83, rather than the user's hand, and the doors 21, 22 are not opened or closed. If the first sensor 81 and only one of the safety sensors 83 is activated as in FIG. 25, then the door assembly 20 may be configured to activate opening or closing of the doors 21, 22 in one embodiment, or to not open/close the doors 21, 22 in another embodiment. A lighted ring 84 may also be used to indicate positive or negative results from the attempt to activate the sensor panel 80 and open/close the door 21, 21. The housing 30 in FIGS. 1A-8 includes one sensor panel 80 on the inside of the stall 10, and it is understood that another such sensor panel 80 may be positioned on the outside of the stall 10 as well.

FIGS. 27-32 illustrate another embodiment of a door assembly 20 in which most of the components and features are similar or identical to the components and features described herein with respect to the embodiment of FIGS. 1A-8 and 11-18. Such shared components and features may not be described again in detail with respect to the embodiment of FIGS. 27-32 for the sake of brevity and are referred to herein with similar reference numbers.

FIGS. 27-32 illustrate the mounting assembly 40 and the motor assembly 70 of this embodiment, which include some components and features that are different from the embodiment of FIGS. 1A-8 and 11-18. In the mounting assembly 40 in FIGS. 27-32, each door 21, 22 has a curved track 44 mounted along the top 28, and each housing 30, 31 has a carriage 50 fixedly connected to the housing 30, 31 proximate the opening 38. The track 44 is formed as a curved rectangular tube defining an elongated, curved cavity 45, with an elongated slot 46 defined between two inwardly extending flanges 47. The track 44 in FIGS. 27-32 is fixedly mounted on the top 28 of the door 21, 22 such that the slot 46 faces upward.

The carriage 50 in FIGS. 27-32 includes multiple rollers that engage the track 44 and roll with respect to the track 44, including a first roller assembly (or first top roller assembly) 51, a second roller assembly (or second top roller assembly) 52, a third roller assembly (or first bottom roller assembly) 53, a fourth roller assembly (or second bottom roller assembly) 54, and a fifth roller assembly (or third top roller assembly) 59. The roller assemblies 51, 52, 53, 54, 59 are all mounted on a carriage frame 55 that is fixedly connected to the housing 30, 31 and may form a portion of the housing 30, 31. The first roller assembly 51 includes a powered roller 51A that is powered for rotation by connection to the motor system 70 as discussed herein. The powered roller 51A has an outer surface that is both resilient and high-friction to enhance engagement with the door 21, 22, e.g., by being made of natural or synthetic rubber. The powered roller 51A is sufficiently wide to extend across the slot 46 and engage the top/outer sides of both flanges 47 of the track 44. The second and fifth roller assemblies 52, 59 each include two free rollers 52A, 52B, 59A, 59B that are each configured to engage the top/outer side of one of the flanges 47 of the track 44. The third roller assembly 53 includes two free rollers 53A (second roller not shown) that are each configured to engage the bottom/inner side of one of the flanges 47 of the track 44. The fourth roller assembly 54 includes two free rollers 54A, 54B that are each configured to engage the bottom/inner side of one of the flanges 47 of the track 44. The second and fourth roller assemblies 52, 54 are both rotatably mounted on a first leg 56 that is connected to the carriage frame 55 and extends downward from the carriage frame 55, with the second roller assembly 52 positioned above the fourth roller assembly 54. The second rollers 52A, 52B are positioned on opposite sides of the first leg 56, and the fourth rollers 54A, 54B are positioned on opposite sides of the leg 56. The first leg 56 extends downward into the slot 46 in the track 44 so the fourth roller assembly 54 can be positioned within the cavity 45 of the track 44. The fifth and third roller assemblies 59, 53 are both rotatably mounted on a second leg 57 that is connected to the carriage frame 55 and extends downward from the carriage frame 55, with the fifth roller assembly 59 positioned above the third roller assembly 53. The second leg 56 extends downward into the slot 46 of the track 44 so the third roller assembly 53 can be positioned within the cavity 45 of the track 44.

In the configuration of FIGS. 27-32, the fifth and second roller assemblies 59, 52 exert a downward force on the track 44 and the door 21, 22, and the third and fourth roller assemblies 53, 54 exert upward forces on the track 44 and the door 21, 22. The third and fifth roller assemblies 53, 59 form the first point of contact 41 with the door 21, 22, and the second and fourth roller assemblies 52, 54 form the second point of contact 42 with the door 21, 22 in this configuration. Depending on the position of the door 21, 22, the second, third, fourth, and/or fifth roller assemblies 52, 53, 54, 59 may be actively exerting force on the door 21, 22, and the roller assemblies 52, 53, 54, 59 may exert different forces on the door 21, 22 based on the position of the door 21, 22. For example, when the door 21, 22 is in the open position, the second point of contact 42 may be exerting an upward force on the door 21, 22, such that the fourth roller assembly 54 exerts the primary force on the door 21, 22 compared to the second roller assembly 52. The first roller assembly 51 may form the third point of contact 43 with the door 21, 22 in this configuration. This may be reversed when the door 21, 22 is in the closed position. The roller assemblies 51, 52, 53, 54, 59 not exerting primary stabilizing forces on the door 21, 22 may also have a stabilizing effect on the door 21, 22 to resist tilting, depending on the position of the door 21, 22. It is understood that all of the roller assemblies 51, 52, 53, 54, 59 may exert lateral forces on the track 44 and the door 21, 22 for further stabilization. The mounting assembly 40 further includes steering bushings 48 extending vertically into the slot 46 and configured to assist in steering the door 21, 22 and reduce catching of the track 44 portions of the carriage 50.

Figure 30:
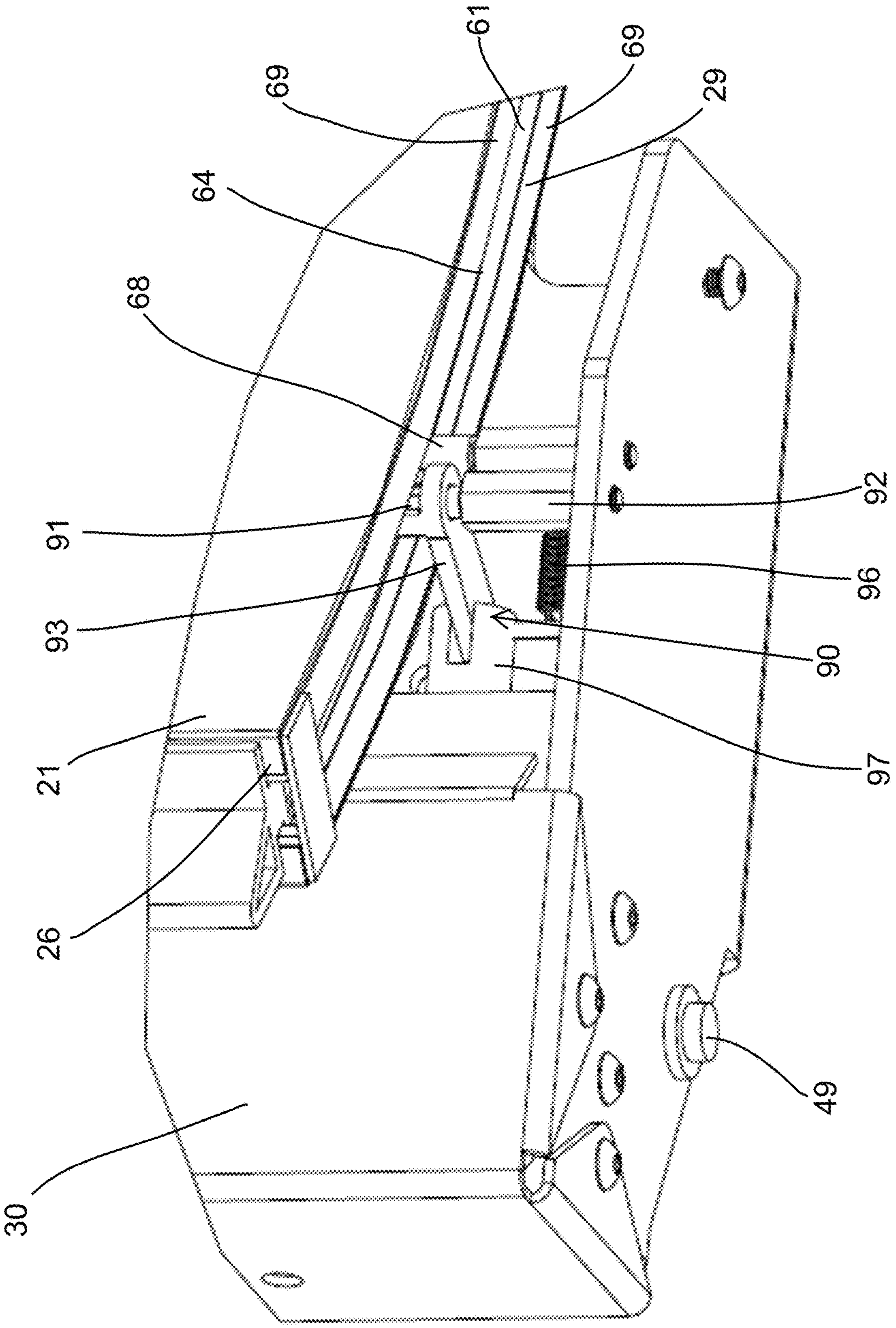
FIG. 30 is a perspective view of additional internal components of the door assembly of FIG. 27.
Figure 31:
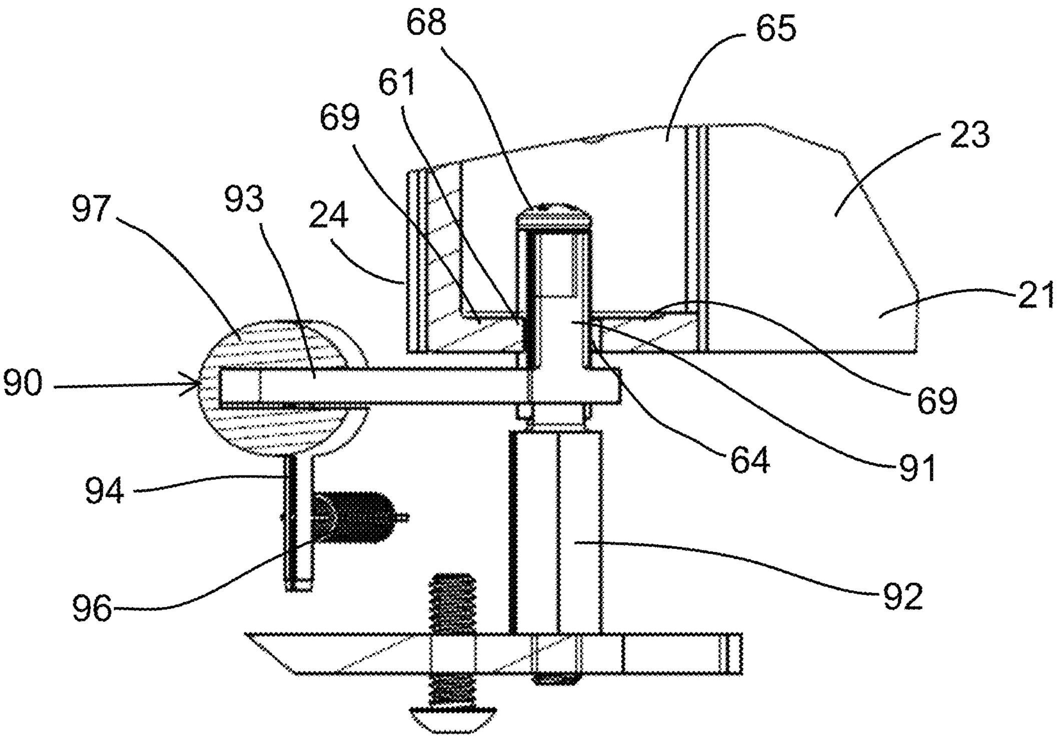
FIG. 31 is a cross-sectional view of a portion of FIG. 30.
Figure 32:
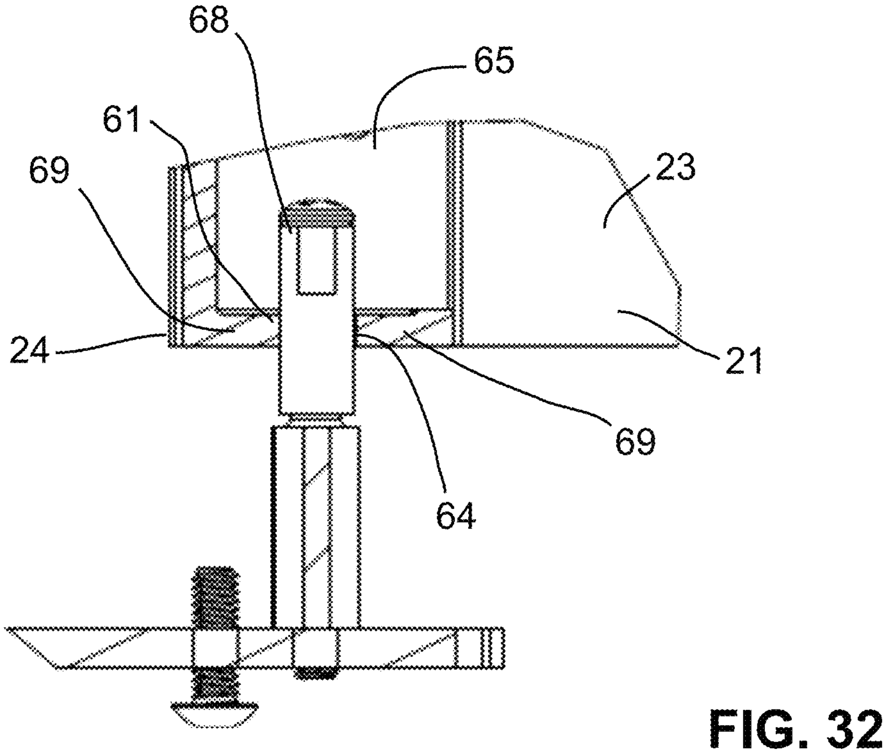
FIG. 32 is a cross-sectional view of a portion of FIG. 30.

The mounting assembly 40 in FIGS. 27-32 also includes a bottom support in the form of a vertical axis bearing 68 that engages the bottom track 61 at the bottom 29 of the door 21, 22, as shown in FIGS. 30-32. The vertical axis bearing 68 in FIGS. 30-32 is in the form of a post that extends into a slot 64 in the track 61 and exerts a lateral stabilizing force on the bottom track 61 in the event that a lateral force is exerted on the door 21, 22, such as by being bumped by a user, to prevent separation of the door 21, 22 from the mounting assembly 40. The vertical axis bearing 68 is not configured to exert a vertical force on the door 21, 22 in this embodiment; however, the vertical axis bearing 68 may include a flange, rollers, or other structure to exert a vertical force on the door 21, 22 in another embodiment. The slot 64 in FIGS. 30-32 is an opening extending into a cavity 65, with flanges 69 on opposite sides, similar to the configuration of the track 44 in FIGS. 1-8A. It is understood that the embodiment illustrated in FIGS. 30-32 may be used in connection with any other embodiment of a mounting assembly 40 described herein, including any of the top support portions of the mounting assembly 40 shown in FIGS. 1A-10 and 20-22.

The mounting assembly 40 in FIGS. 27-32 further includes lever locks 90 at the top 28 and the bottom 29 of each door 21, 22. Each lever lock 90 includes a locking member, in this embodiment a rotatable cam 91, connected to a power source, which in this embodiment is a solenoid 92. The cam 91 is further connected to a lever arm 93 that is engaged with a sliding pin 94 that is received in and travels along a slot 95 to limit rotation of the cam 91. The cam 91 engages the track 44, 61 by being received in the slot 46, 64. The cam 91 has an oblong or asymmetrical structure such that, in the unlocked position, the cam 91 does not engage the edges of the slot 46, 64, (i.e., the flanges 47, 69), and when the cam 91 is rotated to the locked position, the cam 91 engages the edges of the slot 46, 64 to resist movement of the door 21, 22. The lever arm 93 is engaged by a biasing member in the form of a spring 96 that biases the cam 91 to the unlocked position via the lever arm 93. In this configuration, the lever lock 90 is locked only when the solenoid 92 is activated, and the default state of the lever lock 90 is unlocked, including during a power outage or malfunction. The lever lock 90 is also capable of locking the door 21, 22 in any position along the travel path. The lever arm 93 and the sliding pin 94 are also engaged with a pin 97, which is pulled toward the solenoid 94 when the solenoid 94 is powered on, and the lever lock 90 is operated to lock the door 21, 22. The spring 96 pulls the pin 97 outward when the solenoid 94 is powered off, and the lever lock 90 unlocks the door 21, 22. The door assembly 20 may also be provided with a manual override button 49 (see FIG. 30) configured to cut off power to the solenoids 92 to release the lever locks 90 in the event of malfunction and inadvertent locking. In this position, the manual override button 49 can be accessed from inside or outside the stall 10. The manual override button 49 may be positioned on the sensor panel 80 in another embodiment, although this may require two buttons 49, one inside and one outside the stall 10. Other locking mechanisms may be used in other embodiments.

The motor assembly 70 in FIGS. 27-32 includes a motor 71 that is mounted on the housing 30, 31, e.g., by mounting to the carriage frame 55, and has a rotary shaft 72. The motor 71 may be an electric motor 71 in one embodiment. The rotary shaft 72 is engaged with the first roller assembly 51 to rotate the first roller 51A to power movement of the door 21, 22. The motor assembly 70 in FIGS. 27-32 also includes a vertical adjustment mechanism including two mounting rods 75 that extend through motor mounts 76 fixed to the motor 71, such that the motor mounts 76 can travel along the mounting rods 75 to vertically adjust the position of the motor 71 with respect to the door 21, 22. The motor 71 is also engaged by a biasing mechanism to bias the motor 71 downward, which is in the form of biasing springs 85 positioned around the mounting rods 75 and engaging the motor mounts 76 in this embodiment. This biasing mechanism ensures that the powered roller 51A is always firmly engaged with the top 28 of the door 21, 22 with consistent pressure, regardless of the vertical mounting position of the door 21, 22 or any wear on the powered roller 51A that may occur in the course of use. This simplifies installation, because the exact vertical positioning of the motor 71 does not need to be adjusted. The motor 71 in FIGS. 27-31 is vertically oriented and includes an internal 90° gearbox to achieve a horizontal axis for the rotary shaft 72. This orientation of the motor 71 provides a more compact installation and permits the motor 71 to be mounted between the second and fourth roller assemblies 52 and the third and fifth roller assemblies 53, 59. It is understood that the mounting configuration for the motor 71 in FIGS. 27-32 can be used with a horizontally-mounted motor 71 as in FIGS. 1A-8 and 11-18.

The door assembly 20 may further include a controller 100 (shown schematically in FIG. 2), which may be any computing device and may include one or more processors 102 and/or memories 104. The controller may be electronically connected to various components of the door assembly 20, including the motor assembly 70, the position sensor 77, and/or the sensor panel 80, and may communicate with such components, including receiving data from such components and transmitting instructions to such components. The controller may direct operation of the door assembly 20 in an automated manner as disclosed herein through such receiving data and transmitting instructions. For example, the controller may direct components of the door assembly 20 to perform the methods shown schematically in FIGS. 24-26 or the method shown in FIG. 33.

Figure 33:
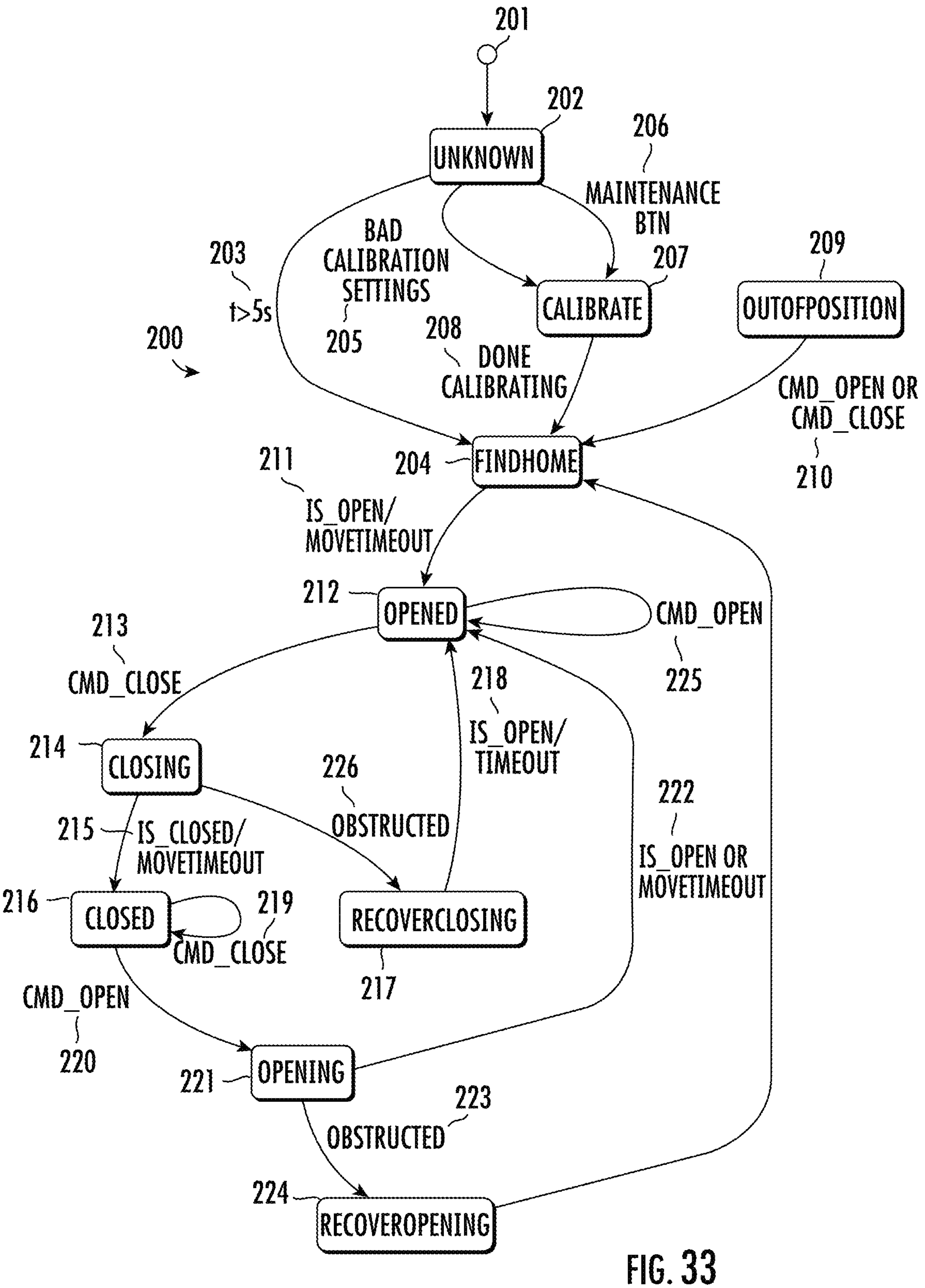
FIG. 33 is a flow diagram illustrating one embodiment of a method of operation of a door assembly according to aspects of the disclosure.

FIG. 33 illustrates a method 200 of operating a door assembly 20 according to embodiments described herein, which includes at least two doors 21, 22, with a motor assembly 70 and a position sensor 77 for each door 21, 22, and may be executed by a controller 100 as described herein. In this method 200, the doors 21, 22 are configured to be in the open positions in a default or steady state condition, such that action is needed to move the doors 21, 22 to the closed positions. The method 200 begins at 201 when power is activated to the door assembly 20. At this time, the positions of the doors 21, 22 are unknown, indicated at 202, and the positions are detected via the position sensors 77. If a period of time (e.g., 5 seconds) has passed without the doors 21, 22 moving, indicated at 203, the method progresses to the home position at 204, which represents the steady state operating condition. If the system (e.g., the controller 100) detects that the calibration settings are bad at 205, or if a maintenance button is pressed at 206, the system repeats the calibration, at 207. When calibration is complete at 208, the method progresses to the home position at 204. It is noted that if the doors 21, 22 are detected to be out of position at 209, the doors 21, 22 are returned to the open or closed position as appropriate at 210, before moving to the home position 204.

From the home position 204, the system confirms (e.g., via position sensors 77) that the doors 21, 22 are open at 211, and the doors 21, 22 remain in the open positions at 212. The doors 21, 22 may be moved to the open positions if necessary, by activating the motors 71. If an open command is initiated at 225, the doors remain in the open positions 212. If a close command is initiated at 213, the system attempts to move the doors 21, 22 to the closed positions by activating the motors 71, at 214. If the system confirms (e.g., via position sensors 77) that the doors 21, 22 are closed at 215, then the doors 21, 22 remain in the closed positions at 216. If instead the closing of the doors 21, 22 is obstructed as detected by the position sensors 77, indicated at 226, a closing recovery protocol is initiated at 217, which returns the doors 21, 22 to the open positions at 218. When the doors 21, 22 are in the closed positions 216 and a close command is initiated at 219, the doors 21, 22 remain in the closed positions 216. If an open command is initiated at 220, the doors 21, 22 are opened at 221 by activating the motors 71. If the system confirms that the doors 21, 22 are open at 222, then the doors 21, 22 return to the open positions 211. If opening of the doors 21, 22 is obstructed 223, as detected by the position sensors 77, then an opening recovery protocol is initiated at 224, which returns the system to the home position 204. The system then proceeds from the home position 204 as described herein.

Figure 34:
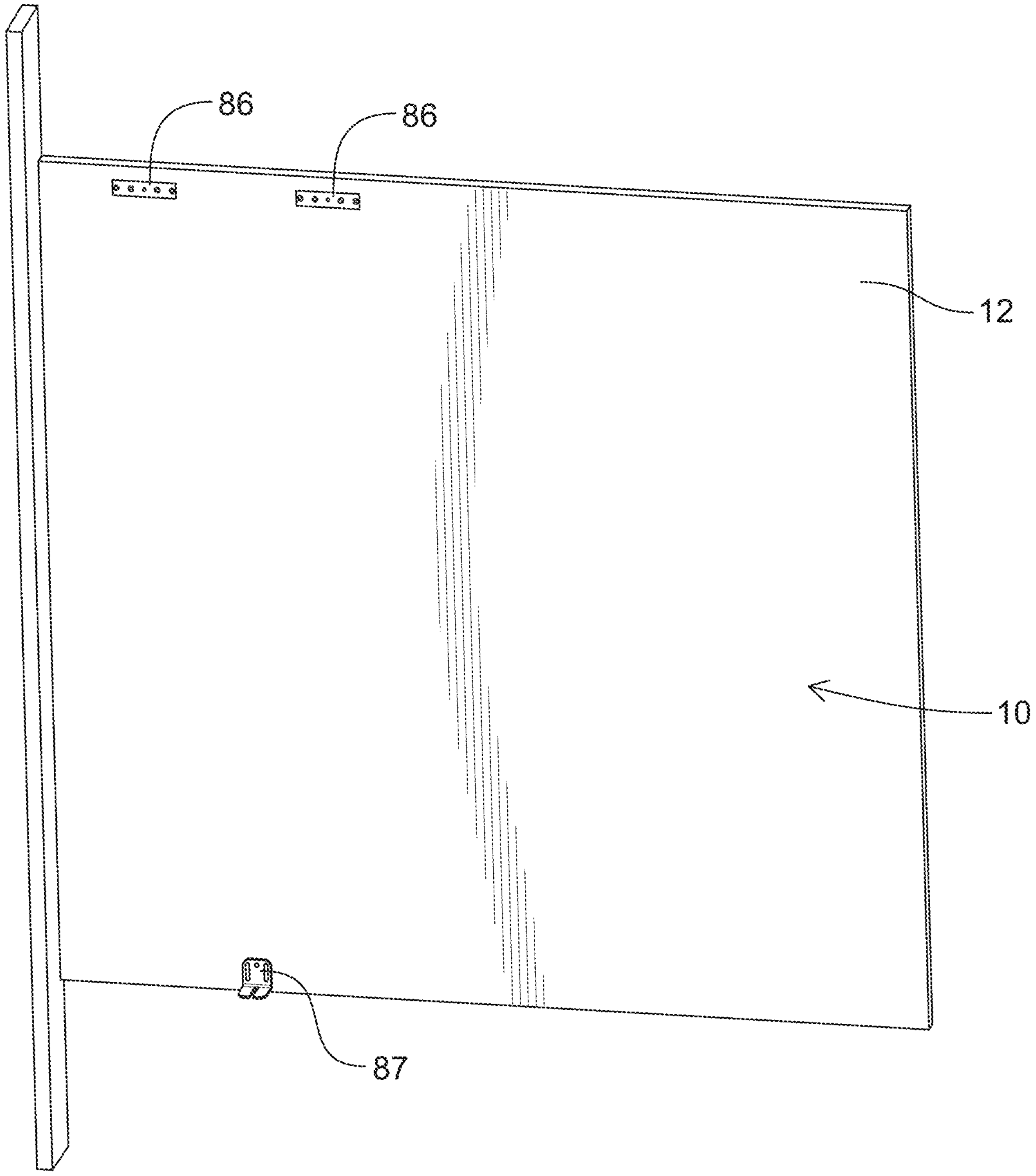
FIG. 34 is a perspective view of a portion of a restroom stall having one embodiment of a mounting assembly for mounting a door assembly according to aspects of the disclosure.
Figure 35:
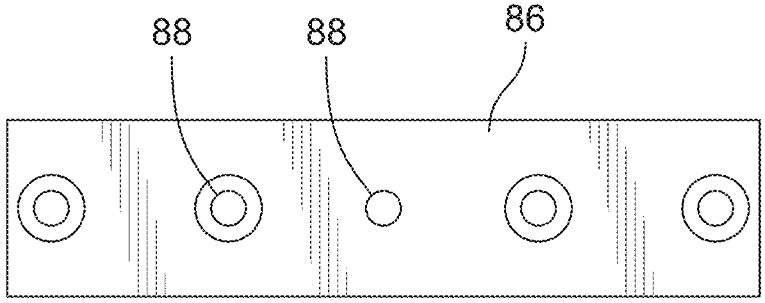
FIG. 35 is a plan view of an upper mount bracket of the mounting assembly of FIG. 34.
Figure 36:
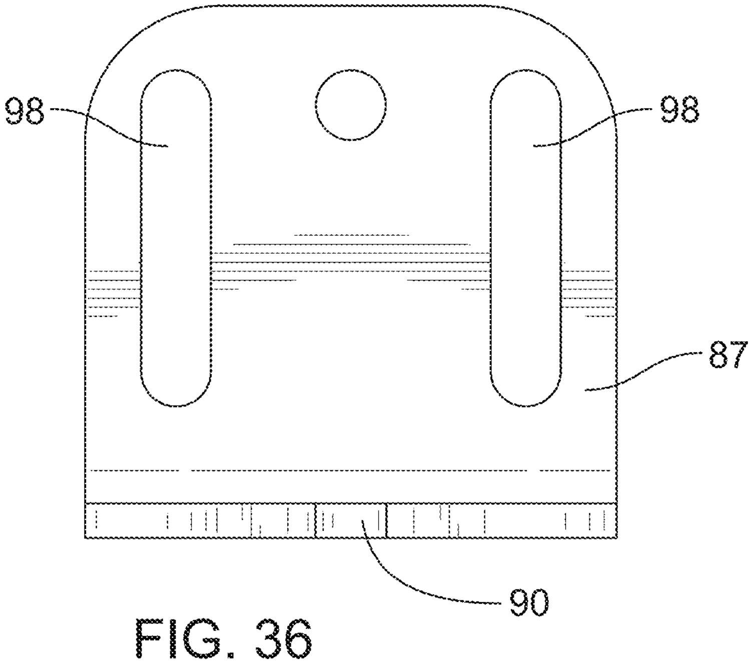
FIG. 36 is a plan view of a lower mount bracket of the mounting assembly of FIG. 34.
Figure 37:
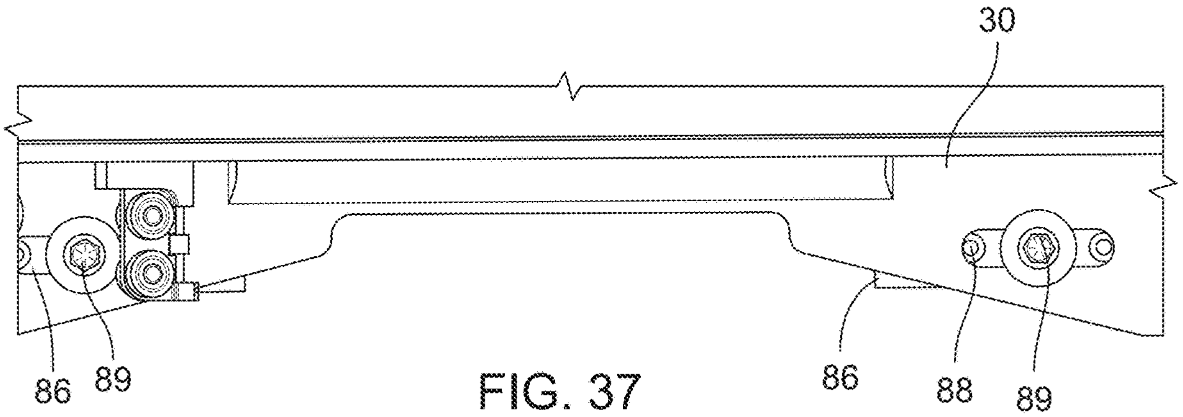
FIG. 37 is a plan view of a portion of a housing mounted in a restroom stall using the mounting assembly of FIG. 34.
Figure 38:
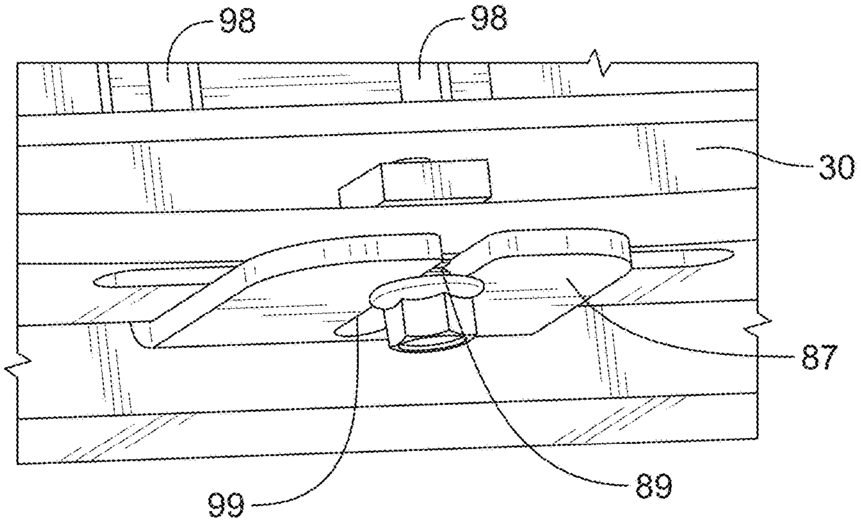
FIG. 38 is a plan view of a portion of a housing mounted in a restroom stall using the mounting assembly of FIG. 34.

An assembly for mounting the door assembly 20 in a stall 10 or other location is shown in FIGS. 34-38 and includes two upper mount brackets 86 and a single lower mount bracket 87 for each housing 30, 31. Each upper mount bracket 86 in FIGS. 34-38 is a rectangular plate with a plurality of fastener holes 88 for receiving bolts, screws, or other fasteners 89 for mounting the upper mount bracket 86 to the respective side wall (e.g., partition 12) and mounting the housing 30, 31 to the upper mount bracket 86. The mounting of the upper mount brackets 86 to the side wall (e.g., partition 12) is shown in FIG. 34, and the mounting of a housing 30 to the upper mount brackets 86 is shown in FIG. 37. The lower mount bracket 87 is a right-angled piece that extends beneath a portion of the housing 30, 31 to support the housing 30, 31 from below. The lower mount bracket 87 in this embodiment has two vertical mounting slots 98 for receiving bolts, screws, or other fasteners 89 for mounting the lower mount bracket 87 to the side wall (e.g., partition 12) and a horizontal mounting slot 99 for receiving a bolt, screw, or other fastener 89 for mounting the housing 30, 31 to the lower mount bracket 87. The mounting of the lower mount bracket 87 to the side wall (e.g., partition 12) is shown in FIG. 34, and the mounting of a housing 30 to the lower mount bracket 87 is shown in FIG. 38. The length of the vertical mounting slots 98 permits the lower mount bracket 87 to be mounted at a variety of different vertical positions and orientations, which permits adjustment of the housing 30, 31 relative to the side wall (e.g., partition 12) in directions and orientations parallel to the side wall. The length of the horizontal mounting slot 99 permits the bottom of the housing 30, 31 to be mounted at various distances from the side wall, thereby permitting adjustment of the housing 30, 31 at various angles to the respective side wall. Installation may involve loosely mounting the housings 30, 31 to the respective partition 12 and adjusting the position and the angle of each of the housings 30, 31 using the freedom for adjustment provided by the upper and lower mount brackets 86, 87. It is understood that the mounting assembly in FIGS. 34-38 may be used to mount any embodiments of the door assembly 20 in a restroom stall 10, and that the mounting assembly may be modified as appropriate to accommodate different configurations of the stall 10 and the door assembly 20.

Various embodiments of door assemblies have been described herein, which include various components and features. In other embodiments, the door assembly may be provided with any combination of such components and features. It is also understood that in other embodiments, the various devices, components, and features of the door assembly described herein may be constructed with similar structural and functional elements having different configurations, including different ornamental appearances.

Figure 23:
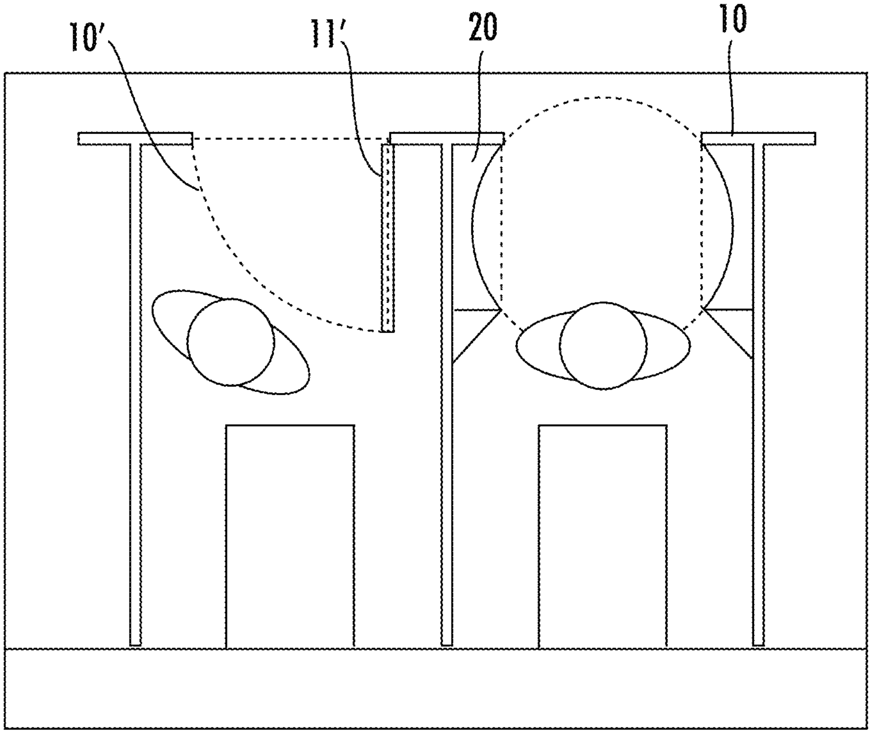
FIG. 23 is a schematic drawing showing a prior art restroom stall next to a restroom stall having a door assembly according to aspects of the disclosure.

The embodiments of the door assembly disclosed herein provide significantly more usable space in a restroom stall 10, as illustrated in FIG. 23, which shows an existing stall 10' outfitted with a swinging door 11' next to a door assembly 20 as disclosed herein. As shown in FIG. 23, the space occupied by the swinging door may instead be occupied by the user and any other objects (e.g., luggage), greatly increasing the amount of usable space within the stall 10. For example, the stall 10 may be provided with at least 10% more usable space in one embodiment, by use of such a door assembly 20. Additionally, the use of automated opening and closing mechanisms for the door assembly 20 provides a more sanitary operation, as no user contact with the door is necessary for operation. Still further benefits are recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "top," "bottom," "front," "back," "side," "rear," "inner," "outer," and the like, as used herein, are intended for illustrative purposes only and do not limit the embodiments in any way. Nothing in this specification should be construed as requiring a specific three dimensional orientation of structures in order to fall within the scope of this invention, unless explicitly specified by the claims. When used in description of a method or process, the term "providing" (or variations thereof) as used herein means generally making an article available for further actions, and does not imply that the entity "providing" the article manufactured, assembled, or otherwise produced the article. The term "approximately" as used herein implies a variation of up to 10% of the nominal value modified by such term, or up to 10% of a midpoint value of a range modified by such term. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A door assembly configured for use in a restroom stall having first and second opposed and parallel side walls facing each other and a front opening, comprising:

a first housing having a first outer side configured to be mounted on the first side wall and a first inner side opposite the first outer side and facing into the stall, the first housing defining a first inner cavity;

a second housing having a second outer side configured to be mounted on the second side wall and a second inner side opposite the second outer side and facing into the stall, such that the first inner side and the second inner side face each other, the second housing defining a second inner cavity;

a first door moveably mounted on the first housing, the first door having opposed inner and outer surfaces that are curved, wherein the first door is moveable along a first arcing path between an open position, wherein the first door is retracted within the first housing and at least partially received in the first inner cavity, and a closed position, where the first door is extended outward of the first housing relative to the open position; and a second door moveably mounted on the second housing, the second door having opposed inner and outer surfaces that are curved, wherein the second door is moveable along a second arcing path between an open position, wherein the second door is retracted within the second housing and at least partially received in the second inner cavity, and a closed position, where the second door is extended outward of the second housing relative to the open position, wherein the first and second doors are configured such that, in the closed positions, the first and second doors combine to obstruct the front opening, and in the open positions, the first and second doors permit passage through the front opening.

2. The door assembly of claim 1, further comprising:

a first track positioned on a top side of the first door, wherein the first track is curved along the top side of the first door;

a first carriage positioned on the first housing, wherein the first carriage engages the first track to permit the first door to move between the open position and the closed position, such that the first track defines the first arcing path;

a second track positioned on a top side of the second door, wherein the second track is curved along the top side of the second door; and a second carriage positioned on the second housing, wherein the second carriage engages the second track to permit the second door to move between the open position and the closed position, such that the second track defines the second arcing path.

3. The door assembly of claim 2, further comprising:

a plurality of first rollers rotatably mounted on the first carriage and configured to engage the first track and to roll along the first track as the first door moves between the open position and the closed position; and a plurality of second rollers rotatably mounted on the second carriage and configured to engage the second track and to roll along the second track as the second door moves between the open position and the closed position.

4. The door assembly of claim 1, further comprising:

a first track positioned on a top side of the first door, wherein the first track is curved along the top side of the first door;

a plurality of first rollers rotatably mounted on the first housing and configured to engage the first track and to roll along the first track as the first door moves between the open position and the closed position, wherein at least one of the plurality of first rollers is a first powered roller configured to power movement of the first door between the open and closed positions by exerting force on the first track;

a second track positioned on a top side of the second door, wherein the second track is curved along the top side of the second door; and a plurality of second rollers rotatably mounted on the second housing and configured to engage the second track and to roll along the second track as the second door moves between the open position and the closed position, wherein at least one of the plurality of second rollers is a second powered roller configured to power movement of the second door between the open and closed positions by exerting force on the second track.

5. The door assembly of claim 4, further comprising:

a first motor mounted on the first housing and connected to the first powered roller to power rotation of the first powered roller to move the first door between the open position and the closed position;

a second motor mounted on the second housing and connected to the second powered roller to power rotation of the second powered roller to move the second door between the open position and the closed position; and at least one controller configured to control operation of the first motor and the second motor to move the first and second doors.

6. A door assembly configured for use in a restroom stall having first and second opposed side walls and a front opening, comprising:

a first housing configured to be mounted on the first side wall, the first housing defining a first inner cavity;

a second housing configured to be mounted on the second side wall, the second housing defining a second inner cavity;

a first door moveably mounted on the first housing, the first door having opposed inner and outer surfaces that are curved, wherein the first door is moveable along a first arcing path between an open position, wherein the first door is retracted within the first housing and at least partially received in the first inner cavity, and a closed position, where the first door is extended outward of the first housing relative to the open position; and a second door moveably mounted on the second housing, the second door having opposed inner and outer surfaces that are curved, wherein the second door is moveable along a second arcing path between an open position, wherein the second door is retracted within the second housing and at least partially received in the second inner cavity, and a closed position, where the second door is extended outward of the second housing relative to the open position, wherein the first and second doors are configured such that, in the closed positions, the first and second doors combine to obstruct the front opening, and in the open positions, the first and second doors permit passage through the front opening, wherein the first housing further comprises a first curved inner panel facing inward from the first housing and defining the first inner cavity, and the second housing further comprises a second curved inner panel facing inward from the second housing and defining the second inner cavity.

7. The door assembly of claim 1, wherein the first housing has a first outer side opposite the first inner panel and configured to face the first side wall, and the first outer side of the first housing is open such that the first inner cavity is configured to be further defined by the first side wall, and wherein the second housing has a second outer side opposite the second inner panel and configured to face the second side wall, and the second outer side of the second housing is open such that the second inner cavity is configured to be further defined by the second side wall.

8. The door assembly of claim 1, wherein the first housing has a first outer side opposite the first inner panel and configured to face the first side wall, and the first outer side of the first housing is open such that the first inner cavity is configured to be further defined by the first side wall, and wherein the second housing has a second outer side opposite the second inner panel and configured to face the second side wall, and the second outer side of the second housing is open such that the second inner cavity is configured to be further defined by the second side wall.

9. The door assembly of claim 1, wherein the first door has a first outer end distal from the first housing in the closed position, with a first closure member at the first outer end, and the second door has a second outer end distal from the second housing in the closed position, with a second closure member at the second outer end, and wherein the first closure member and the second closure member have complementary interlocking structures to obstruct visibility between the first and second closure members.

10. A door assembly configured for mounting on a first wall, comprising:

a first housing configured to be mounted on the first wall;

a first door moveably mounted on the first housing, the first door having opposed inner and outer surfaces that are curved along a curved length of the first door, wherein the first door is moveable along a first arcing path between an open position, wherein the first door is retracted with respect to the first housing, and a closed position, where the first door is extended outward of the first housing relative to the open position; and a first mounting assembly mounting the first door on the first housing, the first mounting assembly comprising:

a first track positioned on one of the first door and the first housing at a top side of the first door, wherein the first housing and the top side of the first door are operably engaged at the first track to permit the first door to move between the open position and the closed position; and a second track positioned on one of the first door and the first housing at a bottom side of the first door, wherein the first housing and the bottom side of the first door are operably engaged at the second track to permit the first door to move between the open position and the closed position, wherein the first mounting assembly includes first, second, and third points of contact with the first door at the first track and the second track, the first point of contact configured to exert a first vertical force component on the first door, the second point of contact being offset from the first point of contact along the curved length of the first door and configured to exert a second vertical force component on the first door, and the third point of contact being vertically offset from the first point of contact and the second point of contact and configured to exert a third vertical force component on the first door, and wherein the first vertical force component, the second vertical force component, and the third vertical force component combine to resist rotation of the first door.

11. The door assembly of claim 10, wherein the first mounting assembly further comprises:

a first carriage positioned on the other of the first door and the first housing relative to the first track, wherein the first carriage engages the first track to permit the first door to move between the open position and the closed position.

12. The door assembly of claim 11, wherein the first mounting assembly further comprises:

a second carriage positioned on the other of the first door and the first housing relative to the second track, wherein the second carriage engages the second track to permit the first door to move between the open position and the closed position.

13. The door assembly of claim 11, wherein the first mounting assembly further comprises:

a plurality of rollers rotatably mounted on the first carriage and configured to engage the first track and to roll along the first track as the first door moves between the open position and the closed position.

14. The door assembly of claim 13, wherein the plurality of rollers form at least the first and second points of contact.

15. The door assembly of claim 10, wherein the first point of contact and the second point of contact are located at the first track at the top side of the first door, and the third point of contact is located at the second track at the bottom side of the first door.

16. The door assembly of claim 15, wherein the third point of contact is directly below and vertically offset from the first point of contact, and the second point of contact is offset from the first and third points of contact along the curved length of the first door and also vertically offset from the third point of contact.

17. A door assembly configured for mounting on a first wall, comprising:

a first housing configured to be mounted on the first wall;

a first door moveably mounted on the first housing, the first door having opposed inner and outer surfaces that are curved and a top side and a bottom side that are curved with the inner and outer surfaces, wherein the first door is moveable along a first arcing path between an open position, wherein the first door is retracted with respect to the first housing, and a closed position, where the first door is extended outward of the first housing relative to the open position;

a first track positioned on the top side of the first door, wherein the first housing and the top side of the first door are operably engaged at the first track to permit the first door to move between the open position and the closed position;

a first top roller engaging a top of the first track;

a second top roller engaging the top of the first track and spaced from the first top roller along a curved length of the top side of the first door;

a first bottom roller engaging a bottom of the first track; and a second bottom roller engaging the bottom of the first track, wherein the first and second top rollers and the first and second bottom rollers are configured to roll along the first track as the first door moves between the open position and the closed position, wherein at least one of the first and second top rollers and the first and second bottom rollers is a powered roller configured to power movement of the first door between the open and closed positions by exerting force on the first track, and wherein the first track has a slot extending along the curved length of the first door, and wherein the first bottom roller is mounted on a first leg that extends downward through the slot to position the first bottom roller on the bottom of the first track.

18. The door assembly of claim 17, wherein the first top roller is also mounted on the first leg at a location above the first track.

19. The door assembly of claim 17, further comprising a third top roller engaging the top of the first track adjacent to the first top roller, such that the first top roller and the third top roller are positioned on opposite sides of the slot.

20. The door assembly of claim 19, further comprising a third bottom roller mounted on the first leg and engaging the bottom of the first track adjacent to the first bottom roller, such that the first bottom roller and the third bottom roller are positioned on opposite sides of the slot.

21. The door assembly of claim 17, wherein the first bottom roller and the second bottom roller are positioned within the first door, between the inner and outer surfaces thereof.

22. The door assembly of claim 17, wherein the first top roller is the powered roller, and the first bottom roller is positioned below the first top roller.

23. The door assembly of claim 17, further comprising a third top roller engaging the top of the first track and spaced from the first top roller and the second top roller along a curved length of the top side of the first door.

24. The door assembly of claim 23, wherein the first top roller is the powered roller, wherein the first bottom roller is positioned directly below the third top roller, and wherein the second bottom roller is positioned directly below the second top roller.

* * * * *